United States Patent
Babaei et al.

(10) Patent No.: US 11,109,418 B2
(45) Date of Patent: *Aug. 31, 2021

(54) MULTIPLE PREAMBLE TRANSMISSION FOR RANDOM ACCESS IN A WIRELESS DEVICE AND WIRELESS NETWORK

(71) Applicant: Ofinno, LLC, Reston, VA (US)

(72) Inventors: Alireza Babaei, Fairfax, VA (US); Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,881

(22) Filed: Aug. 12, 2019

(65) Prior Publication Data
US 2019/0373645 A1   Dec. 5, 2019

Related U.S. Application Data

(63) Continuation of application No. 15/593,084, filed on May 11, 2017, now Pat. No. 10,383,150.

(Continued)

(51) Int. Cl.
*H04W 74/08* (2009.01)
*H04B 17/318* (2015.01)
(Continued)

(52) U.S. Cl.
CPC ...... *H04W 74/0833* (2013.01); *H04B 17/318* (2015.01); *H04W 24/08* (2013.01);
(Continued)

(58) Field of Classification Search
CPC ....... H04L 5/001; H04L 5/003; H04L 5/0035; H04L 5/0053; H04W 24/02;
(Continued)

(56) References Cited

U.S. PATENT DOCUMENTS 8,588,169 B2 * 11/2013 Dinan .................. H04W 48/00
370/329
9,210,675 B2   12/2015 Dinan
(Continued)

FOREIGN PATENT DOCUMENTS

CA   2943697 A1 * 10/2015   ............. H04B 7/086
CA   2943697 C  *  2/2019   ............. H04B 7/086
(Continued)

OTHER PUBLICATIONS

Samsung, RA Preamble Transmission, Oct. 5, 2015, 3GPP, 3GPP TSG RAN WG1 #82bis, Tdoc: R1-155438 (Year: 2015).*
(Continued)

*Primary Examiner* — Eric Nowlin
(74) *Attorney, Agent, or Firm* — Jacob Mangan; Kavon Nasabzadeh; Philip Smith

(57) ABSTRACT

A wireless device transmits preambles at different times. After each transmission of a preamble in the preambles and at least until a transmission of a last preamble in the preambles monitoring, a control channel is monitored for random access responses (RARs) identified by random access radio network temporary identifiers (RA-RNTIs) that each correspond to one of the transmitted preambles. A packet is transmitted based on receiving a first RAR of the RARs.

20 Claims, 24 Drawing Sheets

Related U.S. Application Data

(60) Provisional application No. 62/334,864, filed on May 11, 2016.

(51) Int. Cl.
*H04W 24/08* (2009.01)
*H04W 72/04* (2009.01)

(52) U.S. Cl.
CPC ..... *H04W 72/042* (2013.01); *H04W 72/0446* (2013.01); *H04W 72/0453* (2013.01)

(58) Field of Classification Search
CPC ......... H04W 36/0055; H04W 72/0413; H04W 74/002; H04W 74/006; H04W 74/0833; H04W 84/047
See application file for complete search history.

(56) References Cited

U.S. PATENT DOCUMENTS

| | | | |
|---|---|---|---|
| 9,374,783 B2 | 6/2016 | Heo et al. | |
| 9,521,692 B2 | 12/2016 | Kim et al. | |
| 9,743,431 B2 | 8/2017 | Dinan | |
| 9,848,445 B2 | 12/2017 | Dinan | |
| 9,860,919 B2 | 1/2018 | Yang et al. | |
| 10,039,132 B2 | 7/2018 | Lee et al. | |
| 10,104,627 B2 | 10/2018 | Choi et al. | |
| 10,111,255 B2* | 10/2018 | Islam | H04W 16/28 |
| 10,172,162 B2* | 1/2019 | Yi | H04L 5/0092 |
| 10,341,994 B2* | 7/2019 | Balachandran | H04W 72/048 |
| 10,383,150 B2* | 8/2019 | Babaei | H04W 72/042 |
| 10,568,140 B2* | 2/2020 | Islam | H04W 52/367 |
| 10,624,132 B2* | 4/2020 | Byun | H04W 74/0833 |
| 10,798,734 B2* | 10/2020 | Reddy | H04W 74/0833 |
| 10,813,141 B2* | 10/2020 | Shin | H04L 5/0053 |
| 10,880,929 B2* | 12/2020 | Shin | H04L 5/1469 |
| 10,959,270 B2* | 3/2021 | Niu | H04L 5/1469 |
| 2009/0303896 A1* | 12/2009 | Che | H04W 74/006 370/252 |
| 2009/0316593 A1 | 12/2009 | Wang et al. | |
| 2012/0082107 A1 | 4/2012 | Ou et al. | |
| 2013/0188473 A1 | 7/2013 | Dinan | |
| 2013/0188617 A1 | 7/2013 | Dinan | |
| 2013/0272229 A1* | 10/2013 | Dinan | H04L 43/0864 370/329 |
| 2014/0185467 A1 | 7/2014 | Heo et al. | |
| 2015/0016312 A1 | 1/2015 | Li et al. | |
| 2015/0043505 A1 | 2/2015 | Kim et al. | |
| 2015/0173016 A1 | 6/2015 | Heo et al. | |
| 2016/0057710 A1 | 2/2016 | Dinan | |
| 2016/0088622 A1 | 3/2016 | Dinan | |
| 2016/0242211 A1 | 8/2016 | Chung et al. | |
| 2016/0255591 A1* | 9/2016 | Park | H04W 52/242 455/522 |
| 2016/0286385 A1 | 9/2016 | Ryu et al. | |
| 2017/0094688 A1 | 3/2017 | Lee et al. | |
| 2017/0094690 A1 | 3/2017 | Zhang et al. | |
| 2017/0150530 A1 | 5/2017 | Kim et al. | |
| 2017/0215207 A1* | 7/2017 | Yi | H04L 5/0092 |
| 2017/0231004 A1 | 8/2017 | Babaei | |
| 2017/0280438 A1* | 9/2017 | Balachandran | H04W 4/06 |
| 2017/0303204 A1 | 10/2017 | Hu et al. | |
| 2017/0303224 A1 | 10/2017 | Choi et al. | |
| 2017/0303316 A9 | 10/2017 | Chung et al. | |
| 2017/0332406 A1* | 11/2017 | Islam | H04B 7/0695 |
| 2017/0332407 A1* | 11/2017 | Islam | H04W 52/242 |
| 2018/0076924 A1* | 3/2018 | Lee | H04L 1/0026 |
| 2018/0077645 A1* | 3/2018 | Yan | H04W 52/0219 |
| 2018/0092130 A1 | 3/2018 | Yang et al. | |
| 2018/0098326 A1 | 4/2018 | Kitagawa et al. | |
| 2018/0098354 A1 | 4/2018 | Dinan | |
| 2018/0109971 A1 | 4/2018 | Takeda et al. | |
| 2018/0132273 A1 | 5/2018 | Zhang et al. | |
| 2018/0167890 A1 | 6/2018 | Dinan | |
| 2018/0176957 A1 | 6/2018 | Zhang et al. | |
| 2018/0176960 A1 | 6/2018 | Dinan | |
| 2018/0192440 A1 | 7/2018 | Huang et al. | |
| 2018/0255586 A1 | 9/2018 | Eihaus et al. | |
| 2018/0279363 A1 | 9/2018 | Su et al. | |
| 2018/0359784 A1* | 12/2018 | Agiwal | H04L 5/001 |
| 2018/0359790 A1 | 12/2018 | Ingale et al. | |
| 2019/0098659 A1* | 3/2019 | Reddy | H04W 74/0833 |
| 2019/0104549 A1* | 4/2019 | Deng | H04B 7/0617 |
| 2019/0182682 A1* | 6/2019 | Kim | H04W 16/28 |
| 2019/0373646 A1* | 12/2019 | Shin | H04L 5/0092 |
| 2019/0394806 A1* | 12/2019 | Niu | H04W 72/0446 |
| 2020/0015236 A1* | 1/2020 | Kung | H04W 72/0413 |
| 2020/0107369 A1* | 4/2020 | Jeon | H04W 74/0833 |
| 2020/0178311 A1* | 6/2020 | Shin | H04L 5/0092 |
| 2021/0014903 A1* | 1/2021 | Zhang | H04W 56/0045 |
| 2021/0051707 A1* | 2/2021 | Rastegardoost | H04W 72/14 |
| 2021/0105832 A1* | 4/2021 | Shin | H04L 5/1469 |

FOREIGN PATENT DOCUMENTS

| | | | |
|---|---|---|---|
| CN | 107277897 | 10/2017 | |
| CN | 107432037 | 12/2017 | |
| EP | 2 869 655 A1 | 5/2015 | |
| EP | 3236593 A1 * | 10/2017 | H04W 74/008 |
| WO | 2017024590 | 2/2017 | |
| WO | 20171473883 | 10/2017 | |
| WO | 2017197166 | 11/2017 | |
| WO | WO-2017200735 A1 * | 11/2017 | H04W 52/42 |

OTHER PUBLICATIONS

Qualcomm Incorporated, PRACH Repetition for MTC, Oct. 5, 2015, 3GPP, 3GPP TSG RAN WG1 #82 BIS, Tdoc: R1-155711 (Year: 2015).*

NTT DoCoMo, Views on PRACH repetition in Rel-13 low complexity UE, Oct. 5, 2015, 3GPP, 3GPP TSG RAN WG1 Meeting #82bis, Tdoc: R1-155928 (Year: 2015).*

Qualcomm Incorporated, PRACH Repetition for MTC, Nov. 15, 2015, 3GPP, 3GPP TSG RAN WG1 #83, Tdoc: R1-157028 (Year: 2015).*

RAN1, LS on RA-RNTI determination for PRACH in TDD, Feb. 15, 2016, 3GPP, 3GPP TSG RAN WG1 Meeting #84, Tdoc: R1-161524 (Year: 2016).*

Qualcomm Incorporated, On RA-RNTI determination for PRACH in TDD, Feb. 15, 2016, 3GPP, 3GPP TSG RAN WG1 #84, Tdoc: R1-160867 (Year: 2016).*

R1-160547, 3GPP TSG RAN WG1 #84 , St Julians, Malta, Feb. 15-19, 2016, Agenda item: 7.1.5, Source: Samsung, Title: Corrections on Random Access Procedure.

R1-160625, 3GPP TSG RAN WG1 meeting #84, St Julian's, Malta, Feb. 15-19, 2016, Agenda Item: 7.3.1.4, Source: LG Electronics, Title: Random access in LAA.

R1-162326, 3GPP TSG RAN WG1 Meeting #84bis, Busan, Korea Apr. 11-15, 2016, Agenda Item: 7.3.1.4, Source: ZTE Microelectronics Technology, Nubia Technology, Title: PRACH Design for LAA.

R1-162358, 3GPP TSG RAN WG1 Meeting #84bis, Busan, Korea, Apr. 11-15, 2016, Source: Intel Corporation, Title:PRACH Design for eLAA.

R1-162470, 3GPP TSG RAN WG1 meeting #84bis, Busan, Korea, Apr. 11-15, 2016, Agenda Item: 7.3.1.4, Source: LG Electronics, Title: Random access preamble in LAA.

R2-162428, 3GPP TSG-RAN WG2 Meeting #93bis, Dubrovnik, Croatia Apr. 11-15, 2016, Agenda item: 8.1.1, Source: Huawei, HiSilicon, Title: Considerations on RACH for LAA SCell.

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum;(Release 13).

3GPP TS 36.211 V13.1.0 (Mar. 2016),Technical Specification, 3rd Generation Partnership Project; Technical Specification Group Radio Access Network; Evolved Universal Terrestrial Radio Access (E-UTRA);Physical channels and modulation (Release 13).

(56) References Cited

OTHER PUBLICATIONS

3GPP TS 36.212 V13.1.0 (Mar. 2016), Technical Specification, 3rd Generation Partnership Project; Technical Specification Group Radio Access Network; Evolved Universal Terrestrial Radio Access (E-UTRA);Multiplexing and channel coding (Release 13).
3GPP TS 36.213 V13.1.1 (Mar. 2016), Release 13, Technical Specification(TS).
3GPP TS 36.300 V13.3.0 (Mar. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.1.0 (Mar. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).
3GPP TS 36.331 V13.1.0 (Mar. 2016), Technical Specification, 3rd Generation Partnership Project; Technical Specification Group Radio Access Network; Evolved Universal Terrestrial Radio Access (E-UTRA);Radio Resource Control (RRC); Protocol specification (Release 13).
R1- 160564, 3GPP TSG RAN WG1 Meeting #84, St Julian's, Malta, Feb. 15-19, 2016, Agenda Item: 7.3.1.4, Souce: Samsung, Title: Discussion on RA procedure for UL LAA.
R1-160358, 3GPP TSG RAN WG1 Meeting #84, St Julian's, Malta, Feb. 15-19, 2016, Source: CATT, Title: Support of PRACH for LAA Scell.
R1-160565, 3GPP TSG RAN WG1 Meeting #84, St Julian's, Malta, Feb. 15-19, 2016, Agenda item:7.3.1.4, Source: Samsung, Title: Discussion on PRACH for UL LAA.
R1-160797, 3GPP TSG-RAN WG1 Meeting 84, Feb. 15-19, 2016, St Julian's, Malta, Source: Panasonic, Title: PRACH on Unlicensed Carriers.
R1-160883, 3GPP TSG RAN WG1 Meeting #84, St Julian's, Malta, Feb. 15-19, 2016, Agenda item: 7.2.1.2.2, Source: Qualcomm Incorporated, Title: Random Access Channel Design.
R1-160950, 3GPP TSG RAN WG1 Meeting #84, St Julian's, Malta, Feb. 15-19, 2016, Source: NTT DoCoMo, Inc., Title: Discussion on PRACH for eLAA UL.
R1-160961, 3GPP TSG RAN WG1 Meeting #84, St Julian's, Malta, Feb. 15-19, 2016, Agenda item:7.3.1.4, Source: Coolpad, Title: Discussion on PUSCH and PRACH for eLAA.
R1-160975, 3GPP TSG RAN WG1 Meeting #84, St Julian's, Malta, Feb. 15-19, 2016, Source: MediaTek Inc., Title: Considerations on PRACH for LAA.
R1-160999, 3GPP TSG-RAN WG1#84, St Julian's, Malta, Feb. 15-19, 2016, Source: Ericsson, Title: PRACH Design for Enhanced LAA.
R1-162132, 3GPP TSG RAN WG1 Meeting #84bis, Busan, Korea Apr. 11-15, 2016, Agenda Item: 7.3.1.4, Source: Huawei, HiSilicon, Title: PRACH for eLAA.
R1-162145, 3GPP TSG RAN WG1 Meeting #84bis, Busan, Korea, Apr. 11-15, 2016, Agenda Item: 8.1.1, Source: Huawei, HiSilicon, Title: Overview of Radio Access Mechanism for 5G.
R1-162263, 3GPP TSG RAN WG1 Meeting #84bis, Busan, Korea Apr. 11-15, 2016, Source: CATT, Title: Support of PRACH for Rel-14 eLAA.
R1-162471, 3GPP TSG RAN WG1 meeting #84bis, Busan, Korea, Apr. 11-15, 2016, Agenda Item: 7.3.1.4, Source: LG Electronics, Title: Random access procedure in LAA.

R1-162527, 3GPP TSG RAN WG1 Meeting #84bis, Busan, Korea Apr. 11-15, 2016, Agenda item: 7.3.1.4, Source: HTC, Title: Discussion on PRACH design for LAA.
R1-162619, 3GPP TSG RAN WG1 Meeting #84bis, Busan, Korea, Apr. 11-15, 2016, Agenda Item: 5, Source: Huawei, HiSilicon, Title: Prach enhancement in high speed scenario.
R1-162668, 3GPP TSG RAN WG1 #84bis, Busan, Korea, Apr. 11-15, 2016, Agenda item: 7.3.1.4, Source: Samsung, Title: PRACH Transmission Aspects.
R1-162669, 3GPP TSG RAN WG1 Meeting #84bis, Busan, Korea Apr. 11-15, 2016, Agenda item: 7.3.1.4, Source: Samsung, Title: Discussion on enhanced random access procedure for UL LAA.
R1-162803, 3GPP TSG RAN WG1 Meeting #84bis, Busan, Korea, Apr. 11-15, 2016, Source: NTT DoCoMo, Inc., Title: Discussion on PRACH for eLAA UL.
R1-162919, 3GPP TSG-RAN WG1 Meeting #84bis, Busan, South Korea, Apr. 11-15, 2016, Agenda item: 7.3.1.4, Source: Nokia, Alcatel-Lucent Shanghai Bell, Title: Discussion on PRACH design for eLAA.
R1-162940, 3GPP TSG RAN WG1 Meeting #84bis, Busan, Korea, Apr. 11-15, 2016, Source: MediaTek Inc., Title: PRACH design in eLAA.
R1-162995, 3GPP TSG RAN WG1 Meeting #84bis, Busan, Korea, Apr. 11-15, 2016, Agenda item: 7.3.1.4, Source: Coolpad, Title: Discussion on PRACH for eLAA.
R1-163026, 3GPP TSG RAN WG1 #84bis, Apr. 11-15, 2016, Busan, Korea, Agenda item: 7.3.1.4, Source: Qualcomm Incorporated, Title: PRACH design details.
R1-163821, 3GPP TSG-RAN WG1#84bis, Busan, Korea, Apr. 11-15, 2016, Source: Ericsson, Title: On Performance of PRACH for Enhanced LAA.
R2-162231, 3GPP TSG-RAN WG2 Meeting #93bis, Dubrovnik, Croatia, Apr. 11-15, 2016, Source: IAESI, Thales, Fairspectrum, Title: High level view of 5G access architecture.
R2-162300, 3GPP TSG-RAN WG2 Meeting #93bis, Dubrovnik, Croatia, Apr. 11-15, 2016, Agenda item: 9.2, Source: Samsung, Title: Preliminary view on Initial Access in 5G.
R2-162367, 3GPP TSG-RAN WG2 Meeting #93bis, Dubrovnik, Croatia, Apr. 11-15, 2016, Agenda item: 9.5.3, Source: Nokia, Alcatel-Lucent Shanghai Bell, Title: Efficient small data transmission.
R2-162393, 3GPP TSG-RAN WG2 Meeting #93bis, Dubrovnik, Croatia, Apr. 11-15, 2016, Source: Samsung, Title: Random Access for eLAA.
R2-162471, 3GPP TSG RAN WG2 #93bis, Dubrovnik, Croatia, Apr. 11-15, 2016, Agenda item: 8.1.1, Source: Intel Corporation, Title: RACH procedure for UL LAA.
R2-162895, 3GPP TSG-RAN WG2 Meeting #93bis, Dubrovnik, Croatia, Apr. 11-15, 2016, Agenda Item: 8.1.1 (LTE_eLAA-Core), Source : LG Electronics Inc., Title: Random access aspect in LAA.
R2-162911, 3GPP TSG-RAN2 Meeting #93bis, Dubrovnik, Croatia, Apr. 12-16, 2016, Agenda item: 8.1.1, Source: Qualcomm Incorporated, Title: RACH Procedure for Enhanced LAA.
Tdoc R2-162745, 3GPP TSG-RAN WG2 #93bis, Dubrovnik, Croatia, Apr. 11-15, 2016, Agenda Item: 8.1.1, Source: Ericsson, Title: Impact on Random Access due to LBT.
Tdoc R2-162763, 3GPP TSG-RAN WG2 #93bis, Dubrovnik, Croatia, Apr. 11-15, 2016, Agenda Item: 9.2, Source: Ericsson, Title: Initial considerations on NR system access.
International Search Report dated Aug. 25, 2017, in PCT/US2017/032238.

* cited by examiner

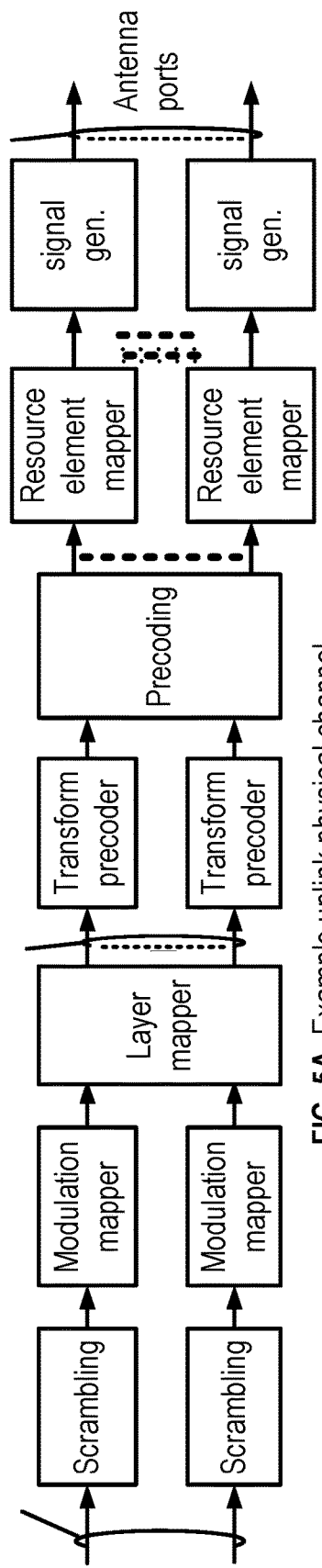
FIG. 5A Example uplink physical channel
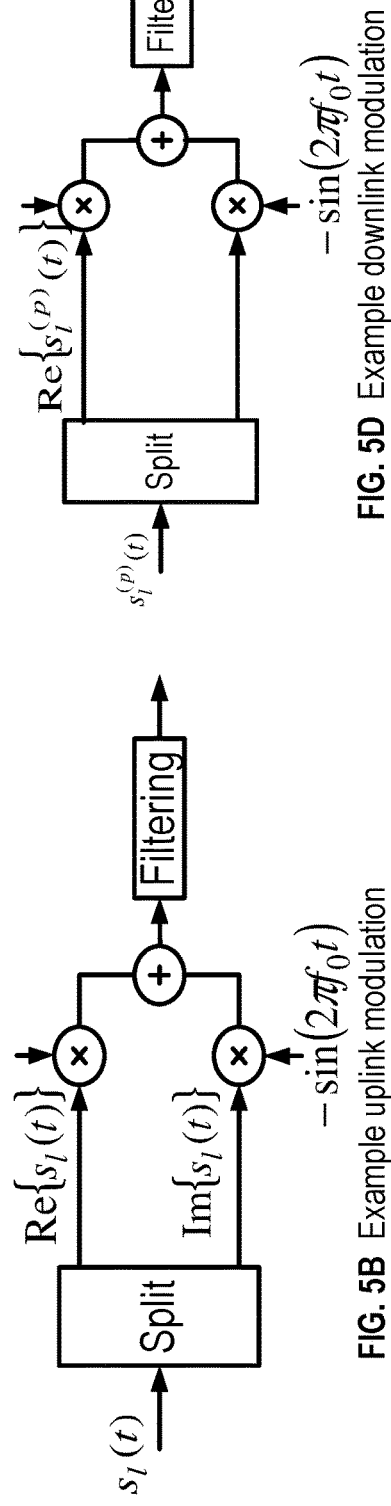
FIG. 5B Example uplink modulation
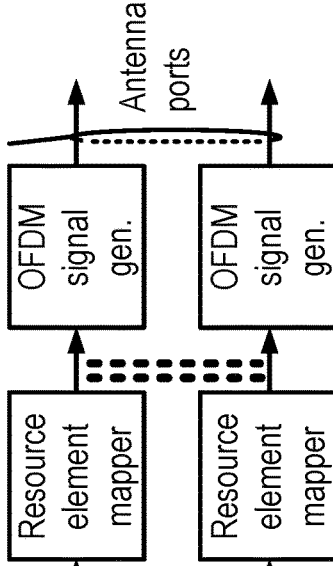
FIG. 5D Example downlink modulation
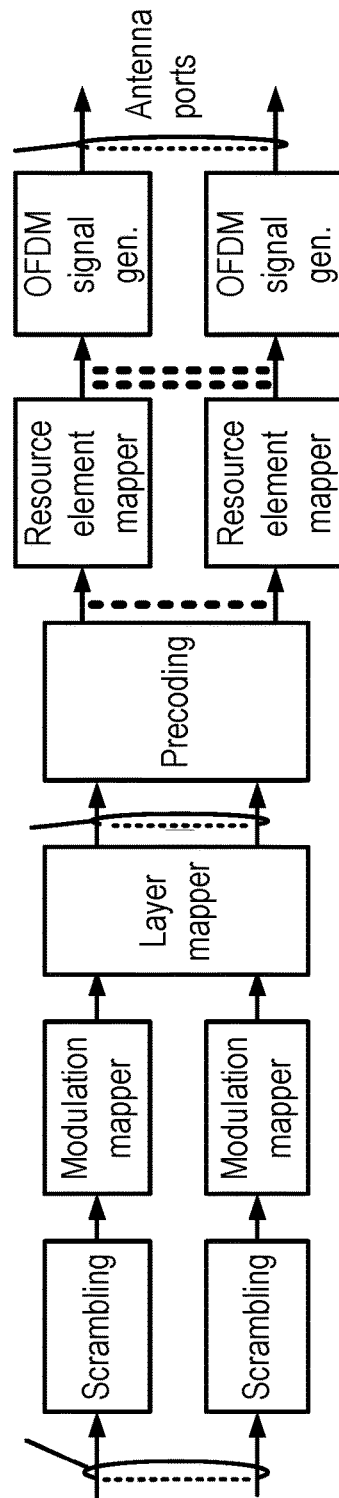
FIG. 5C Example downlink physical channel FIG. 7  Dual-Connectivity- two MAC entities at UE side

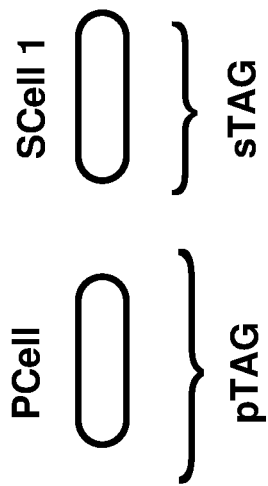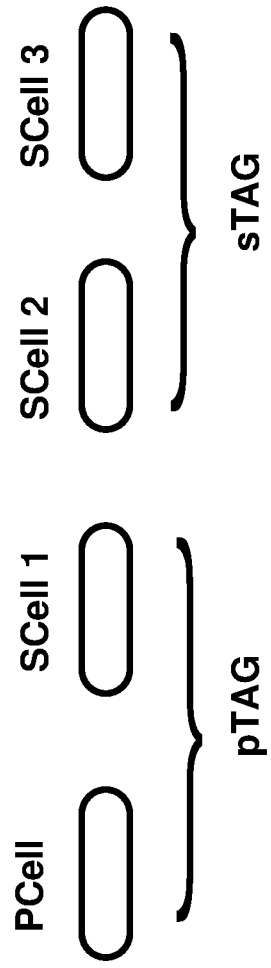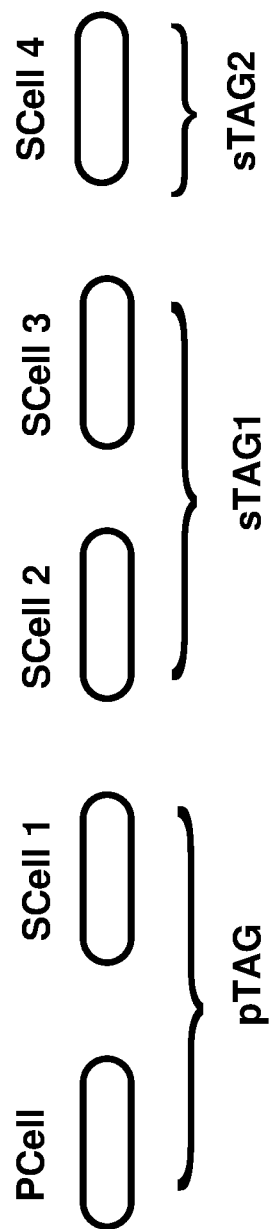
FIG. 8

Example configuration of special subframe

| special subframe configuration | DwPTS | UpPTS | | |
|---|---|---|---|---|
| | | X=0 | X=2 | X=4 |
| 0 | $6592 \cdot T_s$ | $2560*T_s$ | $3*2560*T_s$ | $5*2560*T_s$ |
| 1 | $19760 \cdot T_s$ | $2560*T_s$ | $3*2560*T_s$ | - |
| 2 | $21952 \cdot T_s$ | $2560*T_s$ | $3*2560*T_s$ | - |
| 3 | $24144 \cdot T_s$ | $2560*T_s$ | - | - |
| 4 | $26336 \cdot T_s$ | $2560*T_s$ | - | - |
| 5 | $6592 \cdot T_s$ | $2*2560*T_s$ | $4*2560*T_s$ | $6*2560*T_s$ |
| 6 | $19760 \cdot T_s$ | $2*2560*T_s$ | $4*2560*T_s$ | - |
| 7 | $21952 \cdot T_s$ | $2*2560*T_s$ | - | - |
| 8 | $24144 \cdot T_s$ | $2*2560*T_s$ | - | - |
| 9 | $13168 \cdot T_s$ | $2*2560*T_s$ | $4*2560*T_s$ | $6*2560*T_s$ |

FIG. 11

| Preamble Format | DELTA_PREAMBLE value |
|---|---|
| 0 | 0 dB |
| 1 | 0 dB |
| 2 | -3 dB |
| 3 | -3 dB |
| 4 | 8 dB |

FIG. 21

MULTIPLE PREAMBLE TRANSMISSION FOR RANDOM ACCESS IN A WIRELESS DEVICE AND WIRELESS NETWORK

CROSS-REFERENCE TO RELATED APPLICATIONS

This application is a Continuation of U.S. patent application Ser. No. 15/593,084, filed May 11, 2017, which claims the benefit of U.S. Provisional Application No. 62/334,864, filed May 11, 2016 which is hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11 is an example subframe configuration as per an aspect of an embodiment of the present disclosure.

FIG. 21 is an example table depicting a preamble parameter for various preamble formats as per an aspect of an embodiment of the present disclosure.

DETAILED DESCRIPTION OF EMBODIMENTS

Figure 1:
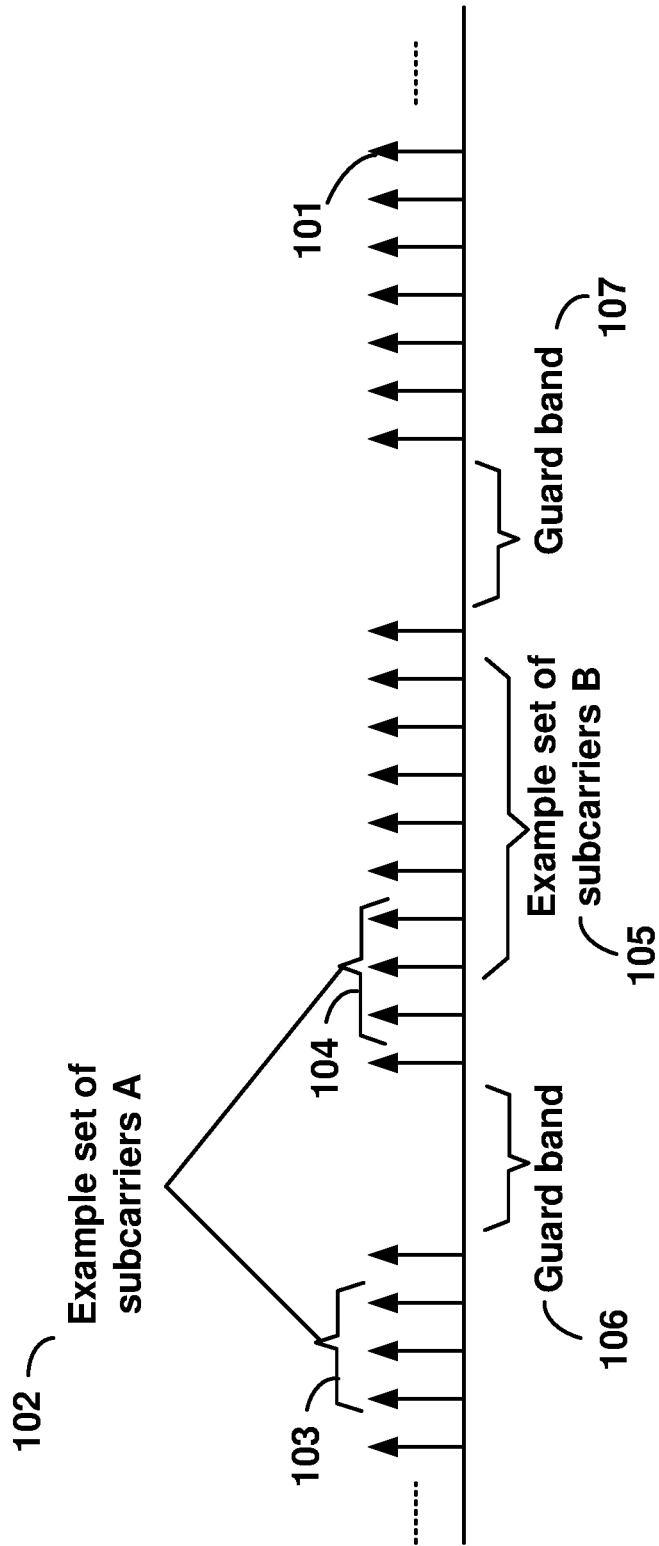
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
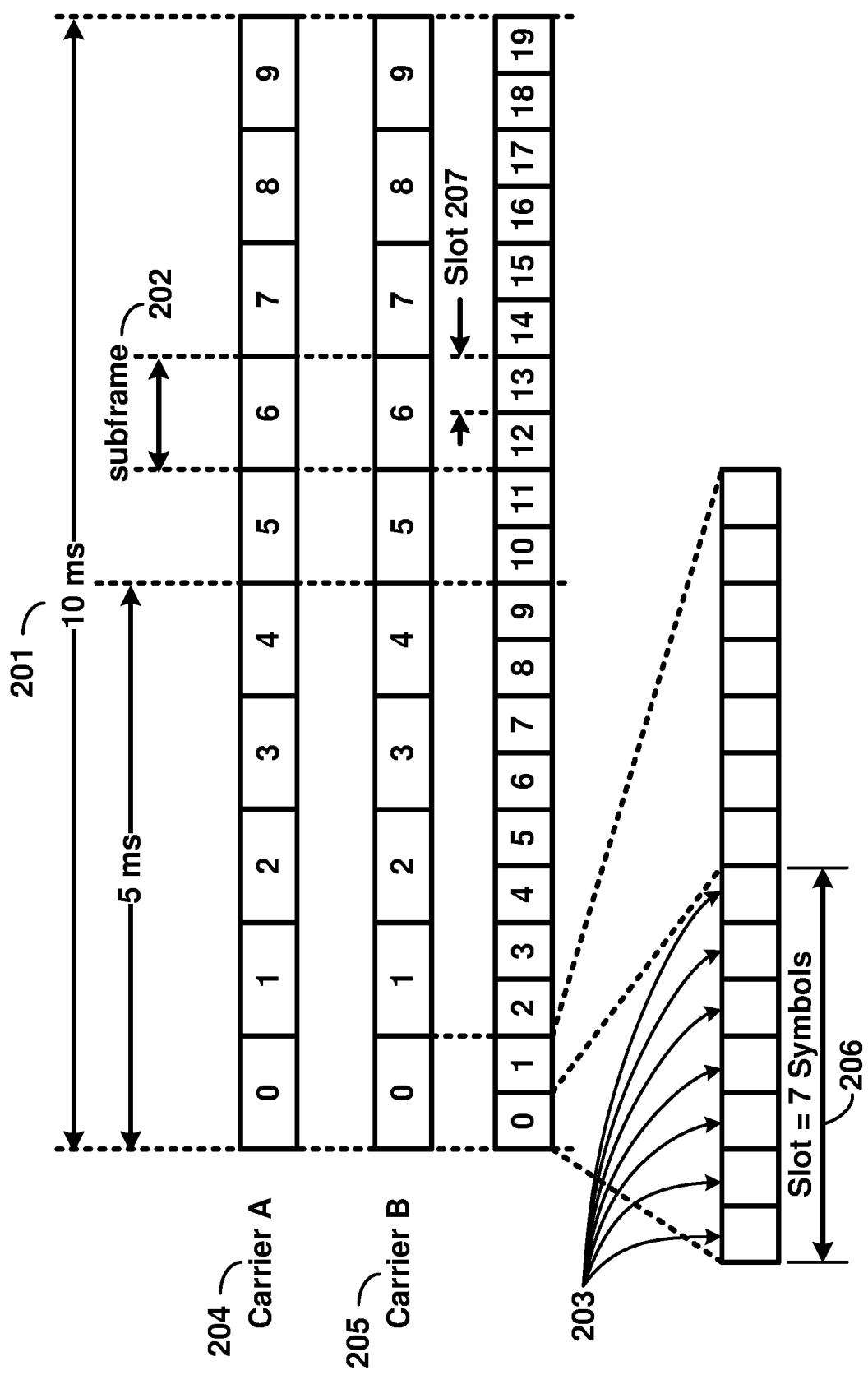
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
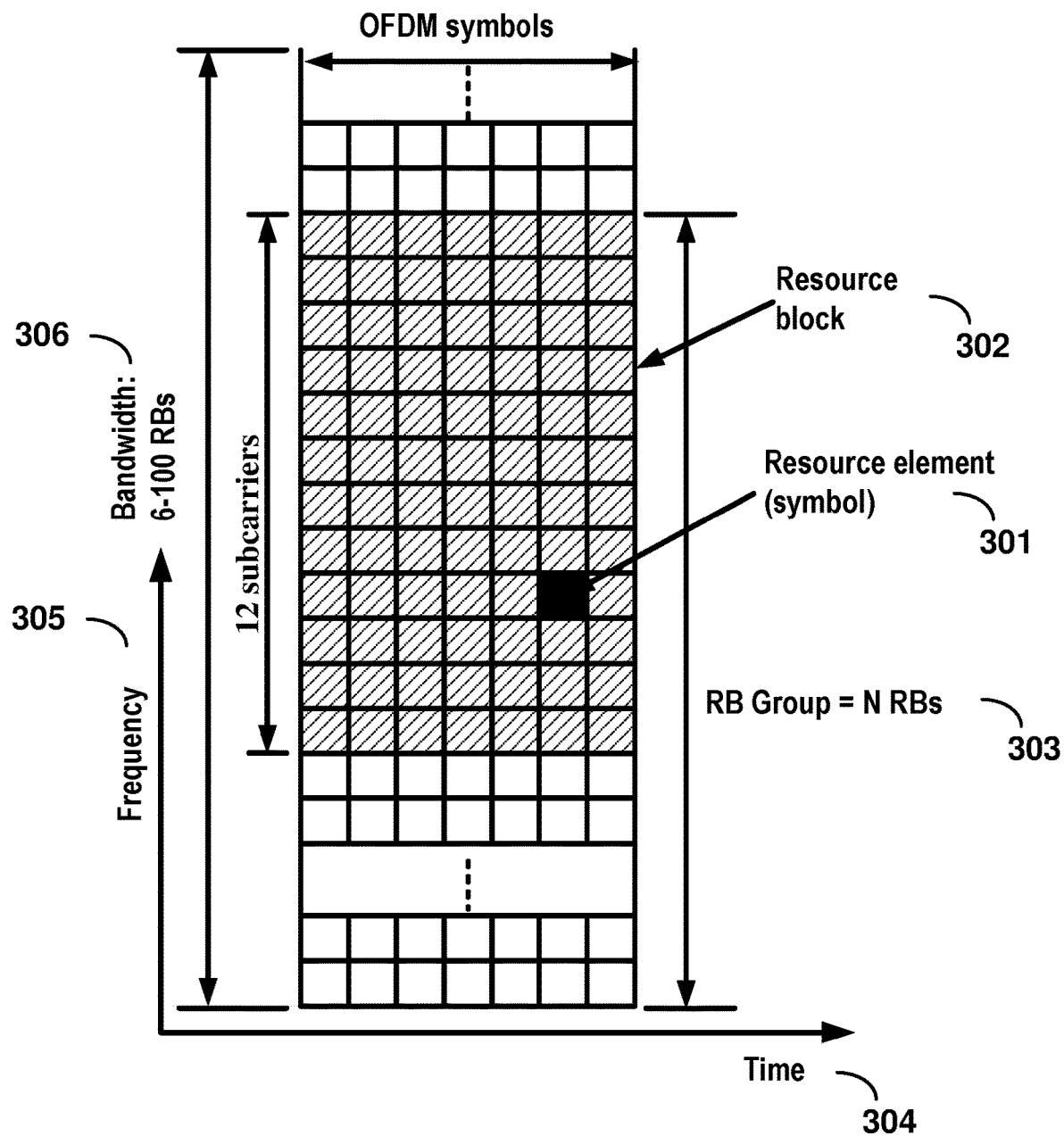
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
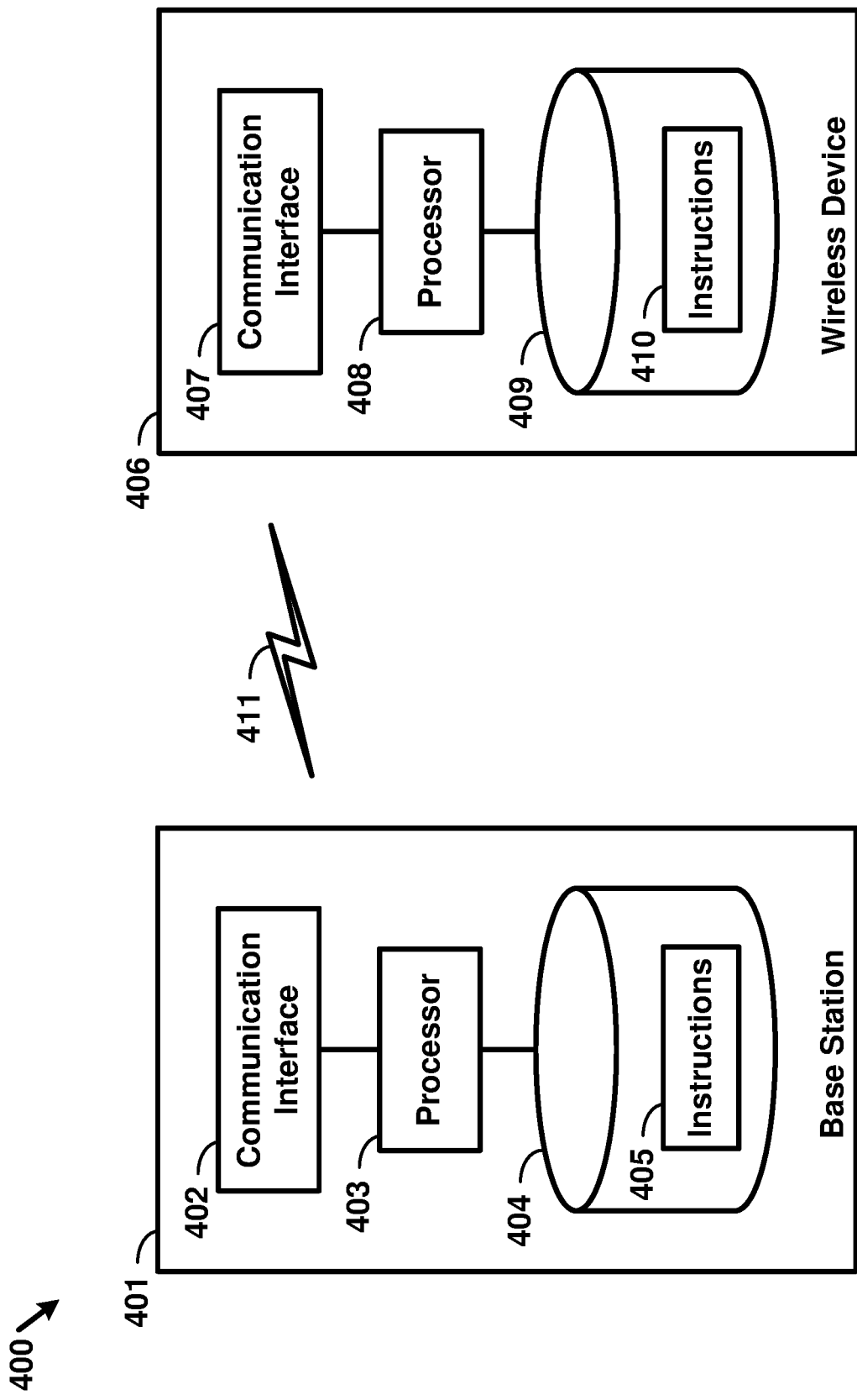
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
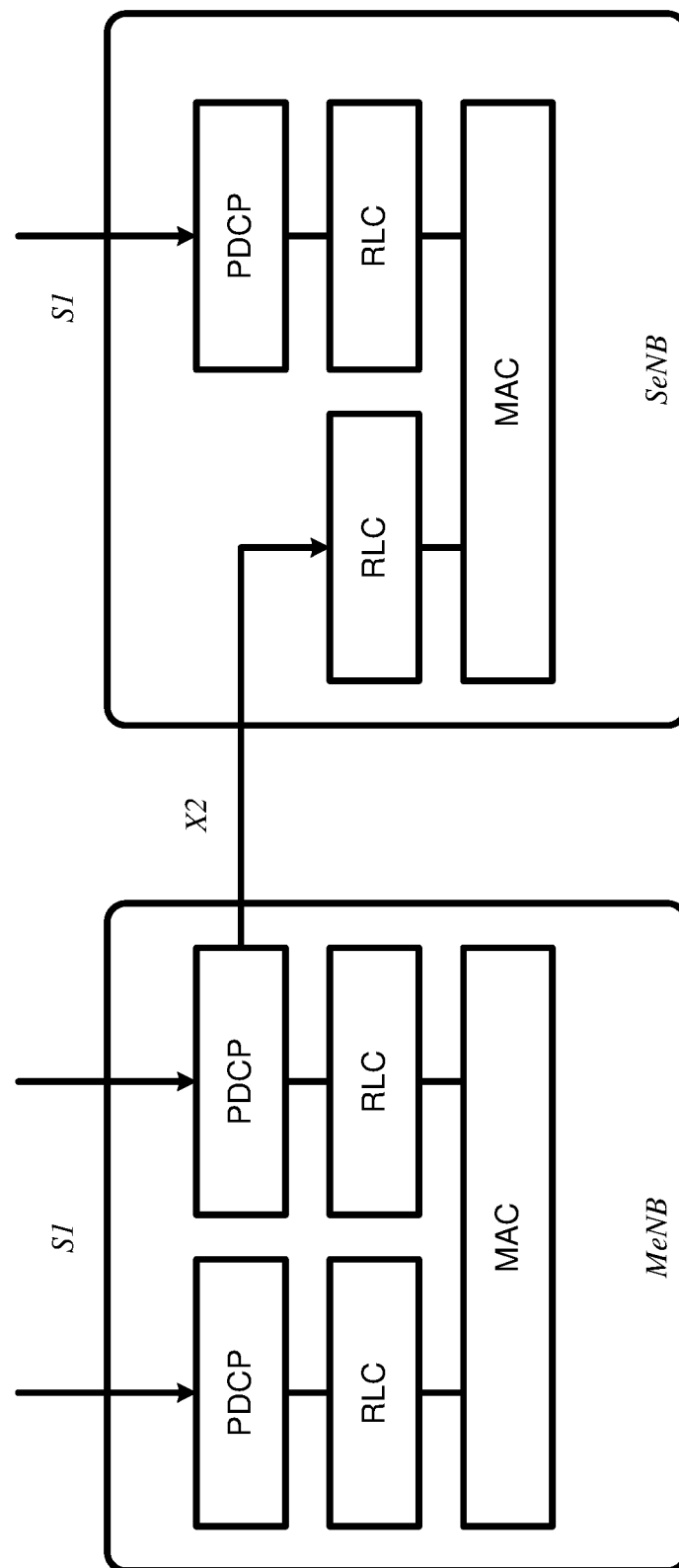
FIG. 6 is an example diagram for a protocol structure with CA and DC as per an aspect of an embodiment of the present disclosure.
Figure 7:
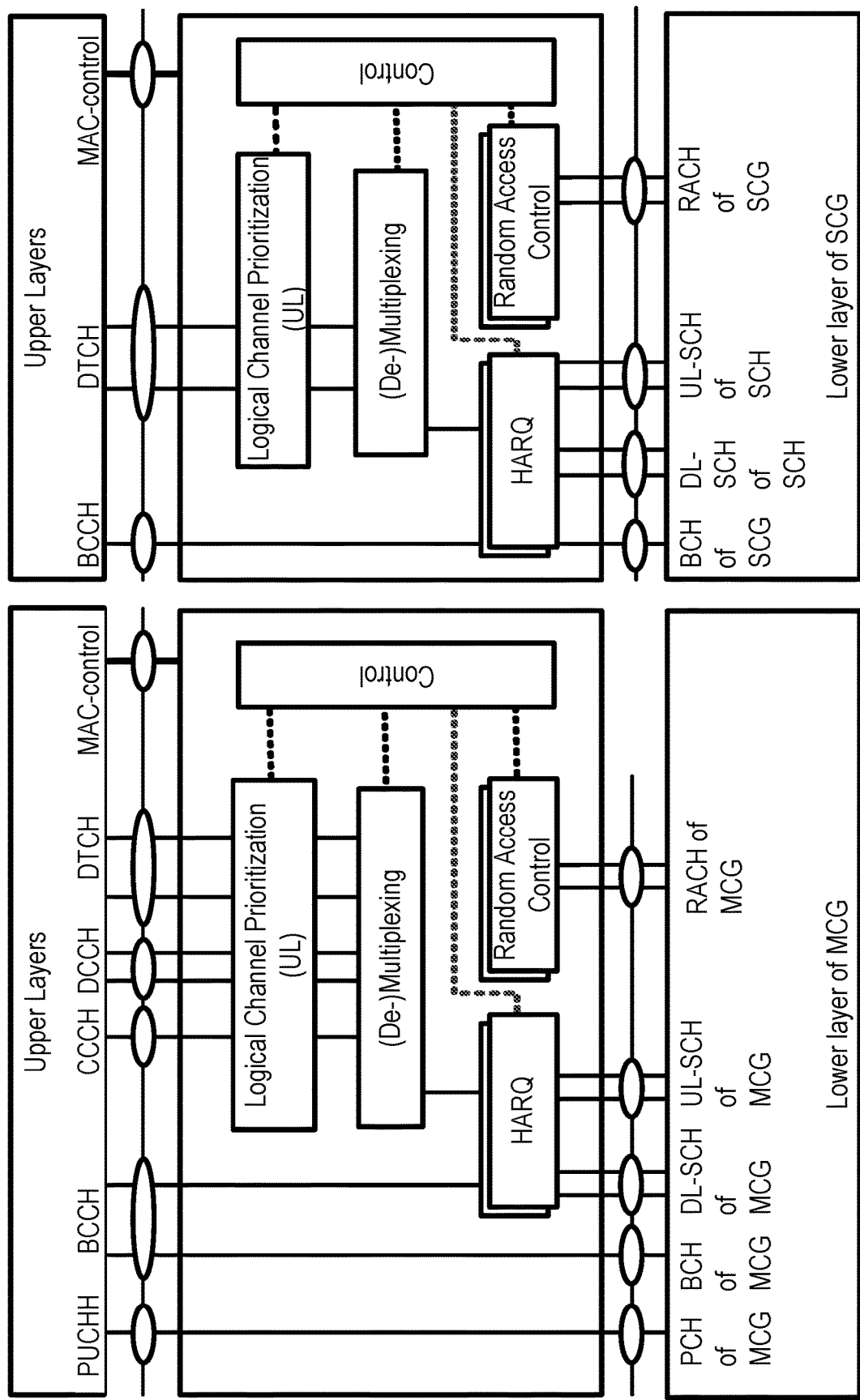
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be transmitted on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
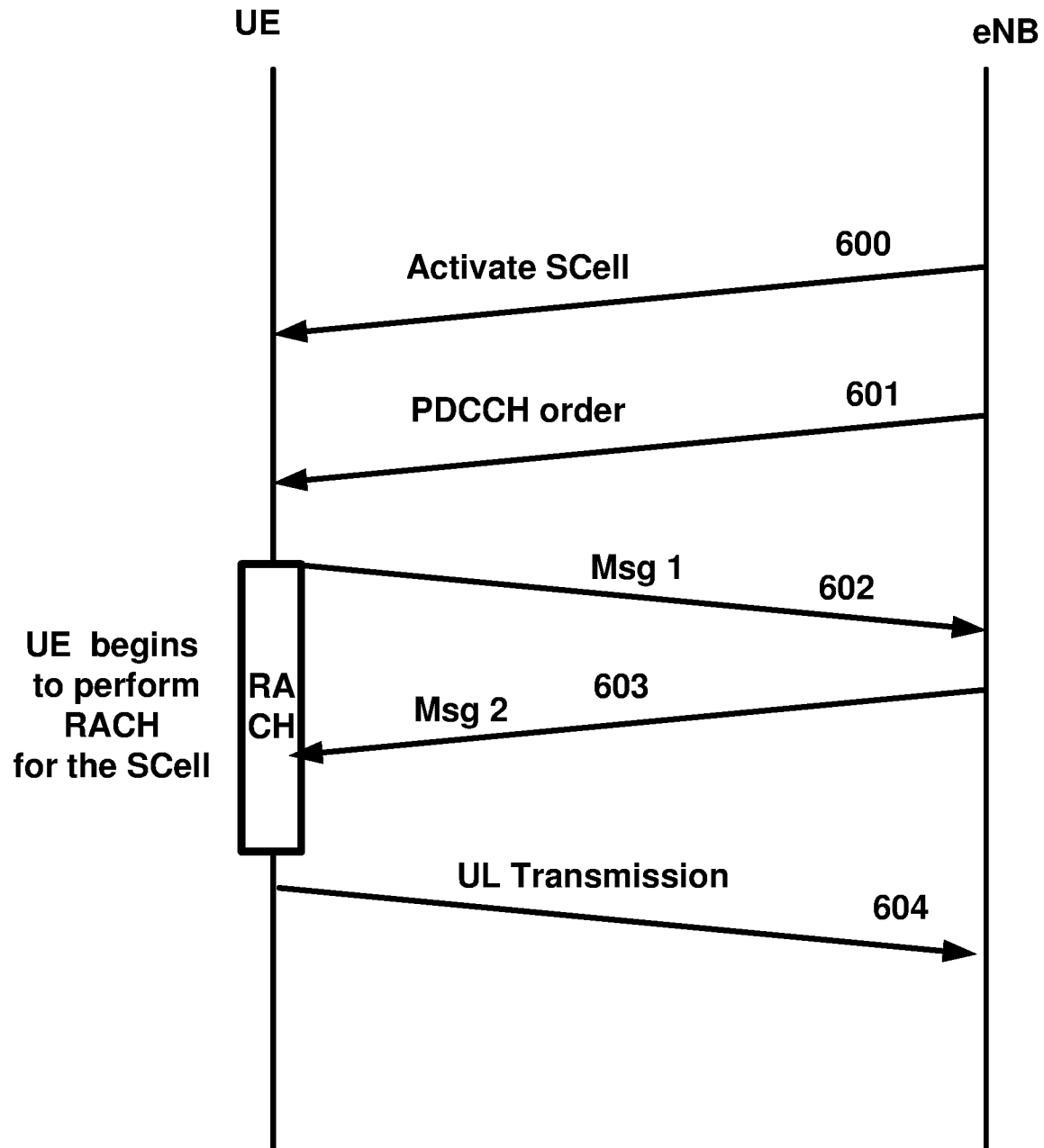
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
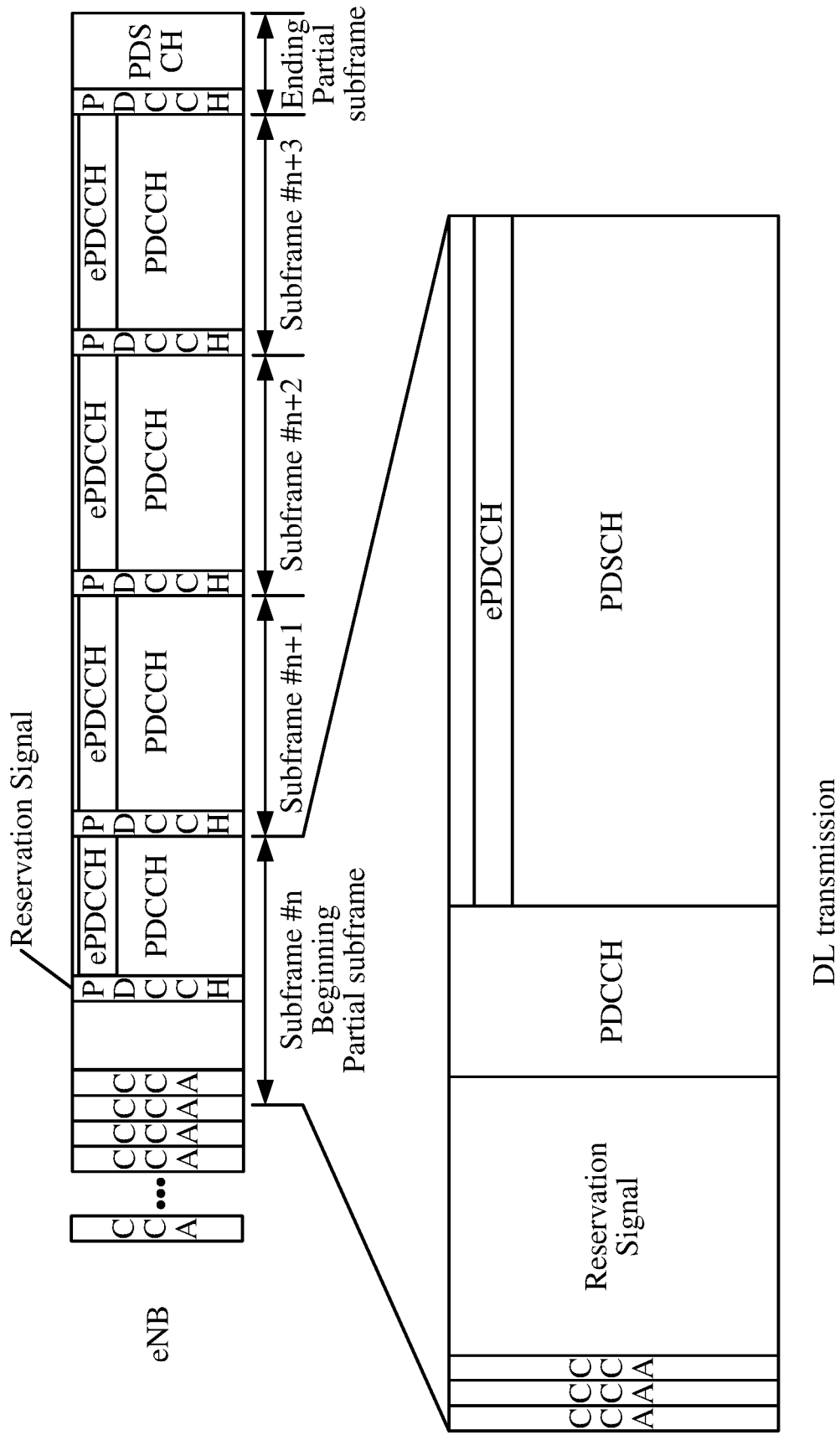
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

An enhanced frame structure type 3 may be applicable to an LAA secondary cell operation. LAA cells may employ normal cyclic prefix. In an example, a radio frame is $T_f=307200 \cdot T_s=10$ ms long and comprises of 20 slots of length $T_{slot}15360 \cdot T_s=0.5$ ms, numbered from 0 to 19. A subframe may be defined as two consecutive slots where subframe i comprises of slots 2i and 2i+1.

Figure 12:
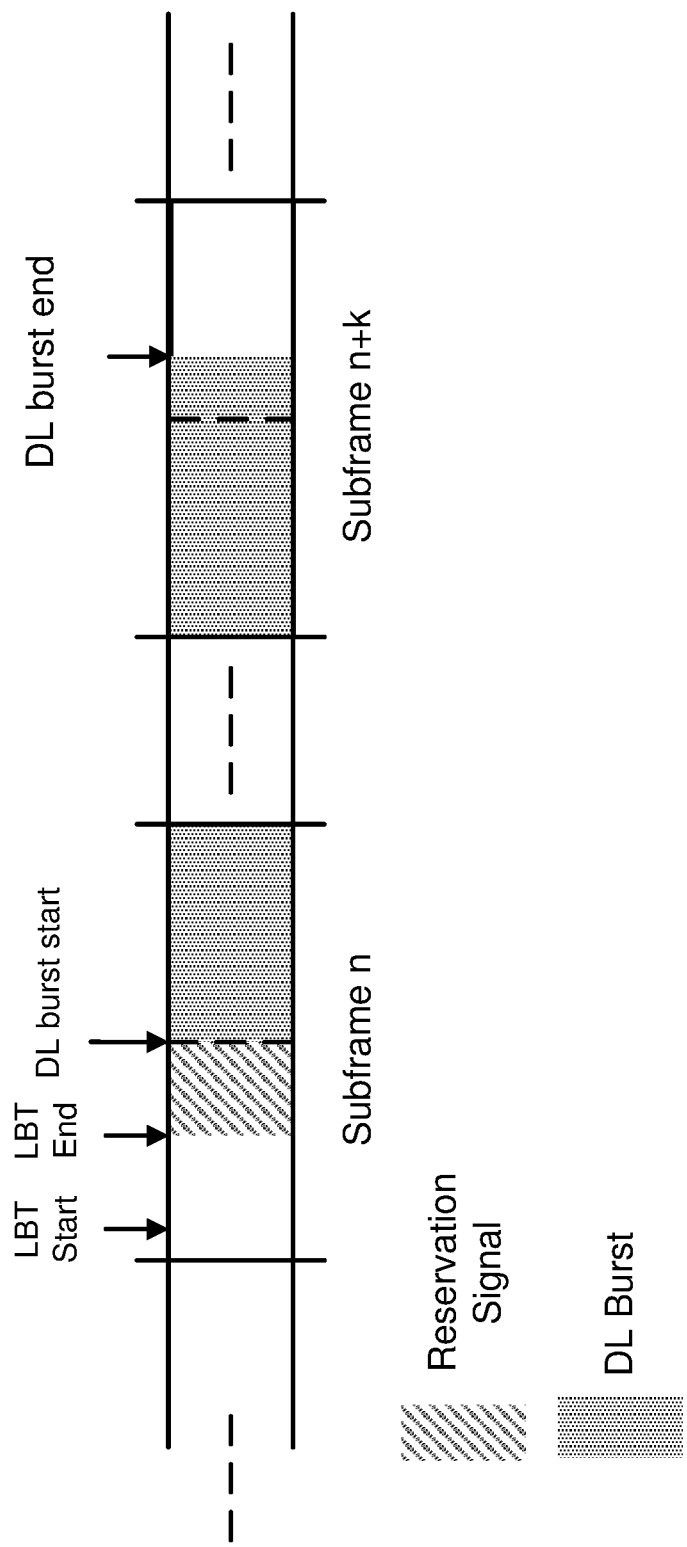
FIG. 12 is an example diagram depicting various signal transmissions as per an aspect of an embodiment of the present disclosure.

The 10 subframes within a radio frame may be available for downlink transmissions. Downlink transmissions occupy one or more consecutive subframes, starting anywhere within a subframe and ending with the last subframe either fully occupied or following one of the DwPTS durations in table in FIG. 11. An example downlink burst is shown in FIG. 12.

In an enhanced frame structure type 3 (may also be called frame structure type 3), a subframe may be used for uplink transmission.

Example embodiments of the invention describes methods and systems for random access preamble transmission in an LAA cell.

The timing alignment requirement for preamble transmission vs subframe boundaries may follow release 13 guidelines for different preamble lengths. The downlink transmission in the table in FIG. 11 may be applicable to Frame structure 2 and 3. Uplink transmissions in LAA (frame structure) may or may not be based on the able in FIG. 11 depending on UE and eNB implementation.

In an example, in a Frame structure type 3, any subframes may be used for transmission of DL burst or UL burst depending on the implementation.

In an example, if the end subframe of a DL transmission burst in an LAA cell is a partial subframe, then the end partial subframe configuration of a DL transmission burst (e.g., number of OFDM symbols) is indicated to the UE in the end subframe and the previous subframe. An eNB may transmit a DCI in a PDCCH common search space using a preconfigured CC-RNTI. The DCI may comprise a field indicating the end partial subframe configuration of a DL transmission burst (e.g., number of OFDM symbols). If the end subframe of a DL transmission burst in LAA is a full subframe, then such signaling may or may not be present.

In an example, random access procedure in an LAA SCell may be contention free and through PDDCH order. An eNB may transmit a PDCCH order to a UE. The UE may transmit a random access preamble on the LAA cell in response to receiving the PDCCH order.

If random access is initiated by eNB through PDCCH order at subframe n, the UE may transmit the preamble at subframe n+k (k>=c, e.g. c=6, 4, etc), if a PRACH resource is available. In an example, c may be a number preconfigured in the wireless device and base station. In an example, the value of c may be configurable. Subframes n+1 to n+c−1 may not be used for preamble transmission.

The random access preamble format 4 transmission may start $4832 \cdot T_s$ before the end of the UpPTS at the UE, where the UpPTS is referenced to the UE's uplink frame timing assuming $N_{TA}=0$. This period is approximately about 2 and 3 symbols before the end of subframe. Considering at least one symbol for LBT, a partial DL subframe may be used for transmission of preamble format 4 after the end of the DL burst, for example, when a DL partial subframe include 10 or less symbols. In an example, PRACH may be transmitted with a non-zero timing advance.

In an example, a partial DL subframe with more than OFDM symbols (e.g., 11 or 12 symbols) may be used for UL LBT and a preamble may be transmitted in the next subframe.

Figure 20:
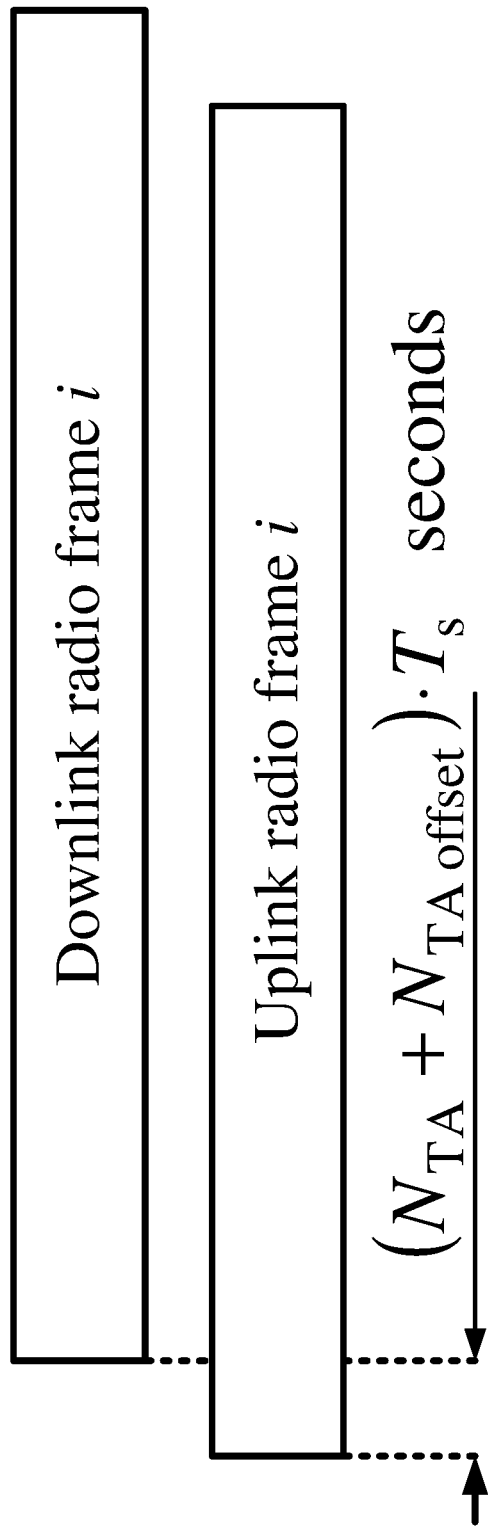
FIG. 20 is an example diagram depicting timing of downlink and uplink transmission as per an aspect of an embodiment of the present disclosure.

The start of the random access preamble formats 0-3 (defined for frame structure types 1 and 2) may be aligned with the start of the corresponding uplink subframe at the UE assuming $N_{TA}=0 N_{TA}$ may be the timing offset between uplink and downlink transmission as shown in example FIG. 20. In an example, the cyclic prefix of a preamble may be shortened to allow LBT before the transmission of the preamble. In an example, PRACH may be transmitted with a non-zero timing advance.

In an example embodiment, RRC configuration index may not be employed for determining subframe configuration (indicating which subframes are used for PRACH) for an LAA PRACH resources. If a UE receives a PDCCH order in subframe n to transmit a random access preamble on an LAA cell, the UE may transmit a random access preamble (RAP) in response to a PDCCH order in any available uplink subframe on or after n+c (e.g. c=6). A UE may determine whether a subframe is available for RAP based on monitoring the physical layer signals and/or other criteria.

If an eNB transmits signals in the downlink, the UE may monitor and receives the eNB downlink signals. When the eNB stops downlink transmission, then UE may look for an opportunity to transmit a random access preamble in PRACH in the available subframe.

The UE may determine a timing and/or preamble format for preamble transmission based on when the eNB ends its downlink transmission. In an example, a UE may employ LBT to determine a timing and/or preamble format for preamble transmission. In an example, a UE may transmit a preamble (e.g. format 4) without an LBT.

Figure 13:
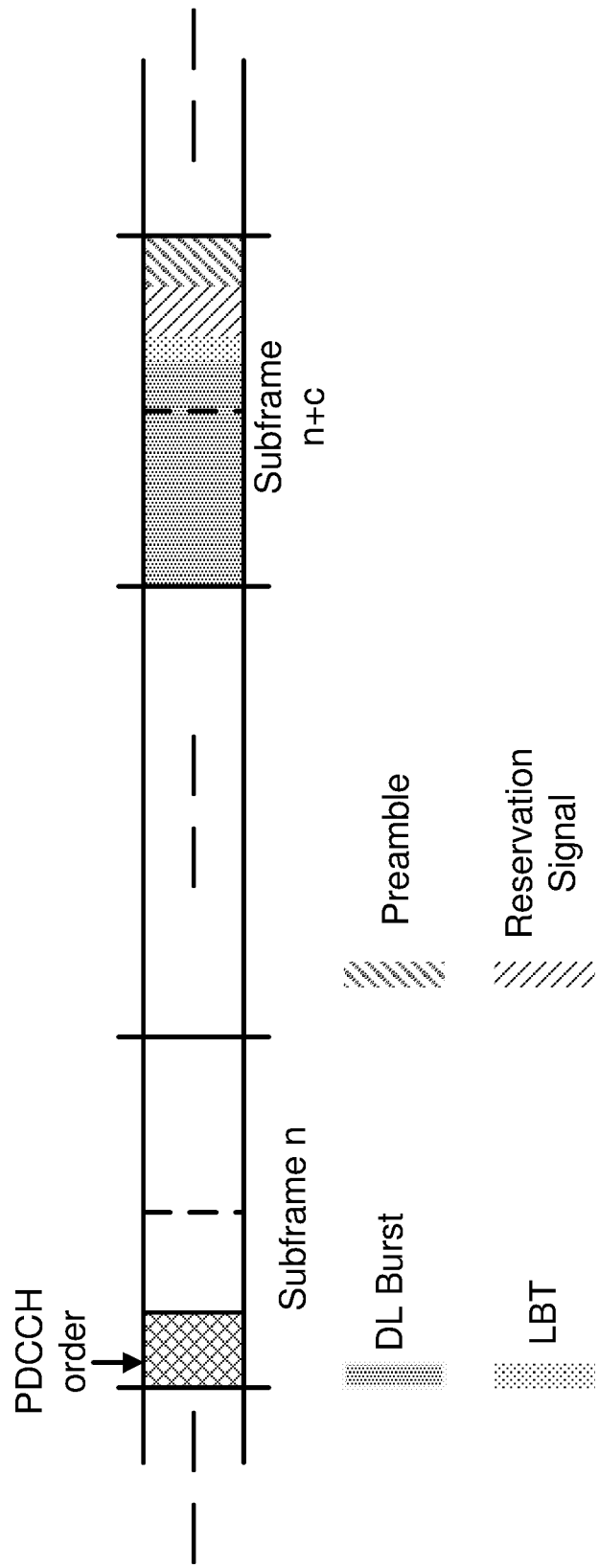
FIG. 13 is an example diagram depicting various signal transmissions as per an aspect of an embodiment of the present disclosure.

In an example embodiment, a UE may be configured to transmit preamble format 4 in response to a PDCCH order. Transmission of preamble format 4 may or may not require LBT in an implementation. If the UE receives a PDCCH order in subframe n, the UE may transmit a format 4 preamble in a subframe (on or after n+c) that is not a full downlink subframe or in a partial end subframe that the UE can transmit a preamble format 4 (considering the limitation regarding the guard period and/or DL/UL switching time and/or time needed for LBT if it is required). An example preamble transmission is shown in FIG. 13. In an example embodiment, transmission of a reservation signal may not be supported for uplink signal transmissions and a UE may transmit a preamble without transmitting a preceding reservation signal.

Figure 14:
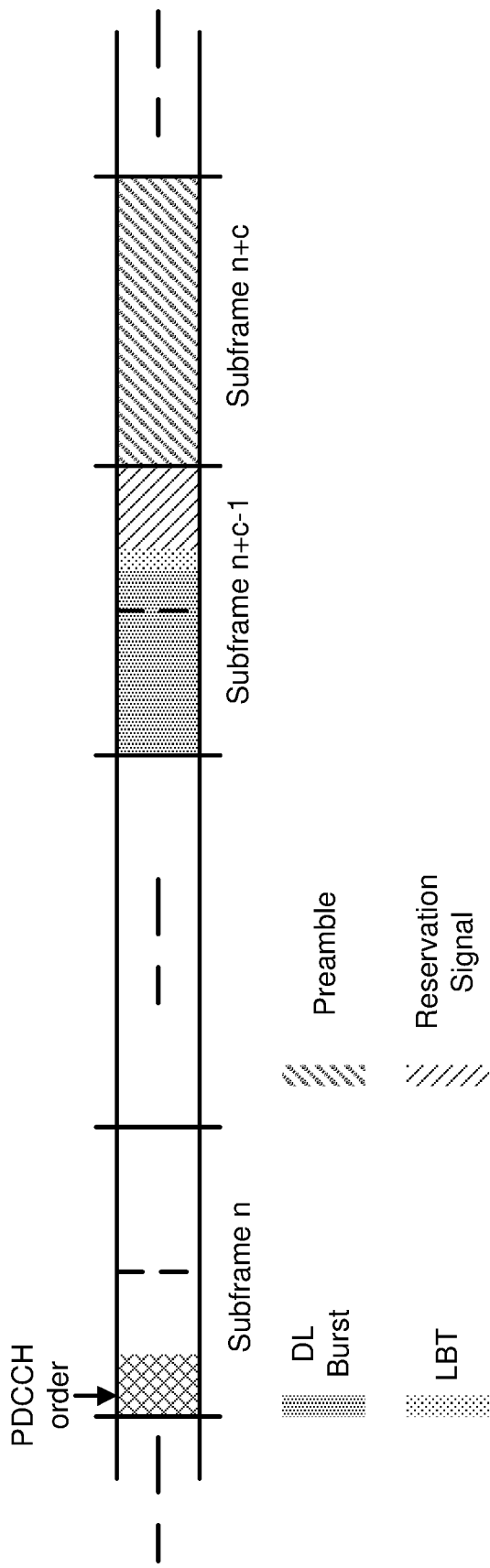
FIG. 14 is an example diagram depicting various signal transmissions as per an aspect of an embodiment of the present disclosure.

In an example embodiment, a UE may be configured to transmit a preamble with one of the formats 0-3 in response to a PDCCH order. Transmission of preamble formats 0-3 may require LBT in an implementation. If the UE receives PDCCH order in subframe n, the UE may transmit a format 0-3 preamble in a subframe (on or after n+c) that is not a full or partial downlink subframe. The UE may be required to perform LBT in the previous subframe to detect a clear channel. The LBT may be performed in a partial end subframe or any subframe after a full downlink subframe. The UE may reserve the channel after successful completion of LBT until the subframe boundary where preamble format 0-3 can be transmitted. An example is shown in FIG. 14. In an example embodiment, transmission of a reservation signal may not be supported for uplink signal transmissions and a UE may transmit a preamble without transmitting a preceding reservation signal.

In an example embodiment, a UE may be configured to transmit a preamble in response to a PDCCH order and the UE may decide what preamble format to choose depending on what preamble format is more suitable for the first transmission opportunity. If the UE receives PDCCH order in subframe n, the UE may transmit the preamble in a subframe (on or after n+c). For example, a UE may choose from preamble format 0 and 4 depending on when resources for uplink preamble transmission is available.

In an example embodiment with multiple LAA secondary cells, a UE may be configured to transmit a preamble format 4, or may be configured to transmit a preamble with one of the formats 0-3, or may be configured to transmit a preamble with any format that is more suitable for a first transmission opportunity on an LAA secondary cell in response to a PDCCH order transmitted by the eNB.

In an LAA system, when an eNB transmits a full downlink subframe, the next available subframe for uplink transmission may be a partial uplink subframe due to transmission gap, NTA requirements, and/or LBT process. In an LAA system, when an eNB transmits an end partial downlink subframe, the next available subframe for uplink transmission may be a full or partial uplink subframe due to transmission gap, NTA requirements, and/or LBT.

In an example implementation, cells in a first group of multiple LAA cells may be aggregated and a UE may not be capable of simultaneous reception and transmission in the aggregated LAA cells. For example, the cells may be in the same band. For example, the cells may be in adjacent frequencies in the same band. This may be due to a software and/or hardware limitation in the wireless device.

Some or all of the cells in the first group of the multiple LAA cells may be capable of simultaneous reception and transmission with the PCell and/or other licensed cells. For example, an LAA cell in the first group may be able to transmit signals while receiving signals on a PCell. In this case, applying constraints to the UE on transmission and reception of signals on LAA based on the state of the PCell (downlink, uplink, or special subframe) seems to be an inefficient and sub-optimal solution.

In an example, a second group of multiple LAA cells different from the first group may be configured. The second group of multiple LAA cells may be aggregated and a UE may not be capable of simultaneous reception and transmission in the aggregated LAA cells of the second group. For example, the cells in the same cell group may be in the same band. For example, the cells may be adjacent in frequency in the same band.

A cell in the first group may transmit signals while a cell in the second group is receiving signals, and vice versa. For example, cells in the first group may be in a first band and the cells in the second group may be in a second band. For example, cells in the first group may employ a first transceiver and cells in the second group may employ a second transceiver. The example embodiments may separately apply to a first group and a second group.

In an example implementation, the cells in the first group may be have their own limitations with respect to simultaneous reception and transmission in the aggregated cells of the first group. In an example implementation, the cells in the second group may be have their own limitations with respect to simultaneous reception and transmission in the aggregated cells of the second group. Cells in different licensed bands may have their own constraints on simultaneous reception and transmission in the aggregated cells.

In an implementation, cells may be grouped according to their limitations on simultaneous reception and transmission in the aggregated cells.

In an example embodiment, a UE may not assume that LAA cells may follow the same uplink and downlink subframes as the PCell. A PCell may employ frame structure Type 1 or 2, while an LAA cell may employ frame structure Type 3. In an example embodiment, constraints are introduced for a UE and/or eNB for cells in a group to reduce the transmit and/or receive possibilities. This may reduce unnecessary signal processing in the UE and/or eNB. The constraints may be employed by the UE and/or eNB to reduce battery power consumption in the UE and/or eNB. The constraints may be applicable to the cells within a cell group, for example, the cells in the licensed band, a first group of cells in an unlicensed band A, a second group of cells in an unlicensed band B, etc. Example embodiments improve LAA cell efficiency and reduces UE battery power consumption and reduces UE processing requirements.

In an example embodiment, cells may be grouped based on simultaneous reception and transmission in the aggregated cells in a group. A UE may not be capable of simultaneous reception and transmission in the aggregated cells within a cell group.

In an example embodiment, a UE may transmit an RRC message (e.g. UE capability message) to the eNB. The message may comprise one or more parameters indicating the UE capability with respect to the example cell grouping. For example, the one or more parameters may indicate certain frequency bands, in which cells are grouped within a cell group. For example, the one or more parameters may comprise a set of frequencies that are in a cell group. For example, the one or more parameters may be a transceiver parameter in the UE indicating the frequency bands in which cells may be grouped. For example, the one or more parameters may indicate a device category or certain capability that indicate the limitation on cell aggregation to the UE.

In an example, such an aggregation limitation in different cell groups may be a characteristic of the UE, and an eNB may not be informed about such limitation. In an example embodiment, the aggregation limitation may be pre-specified in both eNB and UE based on bands, cell frequencies, cell bandwidth, and/or other parameters.

In an example, an eNB may configure the cell grouping in the UE. An eNB may transmit one or more messages to the UE configuring cell grouping based on simultaneous reception and transmission capability in the aggregated cells within a cell group. For example, an eNB may transmit one or more RRC messages comprising cell indexes of a cell group (e.g. identified by a group index). The one or more RRC message may associate the cells with a group, e.g. using a cell group index.

In an example embodiment, a cell in a group may be considered a lead cell. A lead cell may be preconfigured by an RRC message. An RRC message may comprise one or more parameters, e.g. a cell index, of a cell in a cell group. In an example, an RRC may comprise one or more configuration parameters for an SCell that implicitly or explicitly indicates that the cell is a lead cell in a group. In an example, the lead cell may be determined according to a predefined rule, for example the cell with a lowest cell index, and/or the like. The predefined rule may be configured in a UE and/or an eNB.

In an example embodiment, the lead cell may be identified by a UE on a subframe by subframe basis. In an example embodiment, there is no need to select a lead cell, and a collective constraint may be applied to the cells in a group at any moment. In an example, the cell that has certain characteristics at a moment (e.g. eNB is transmitting, UE is transmitting) may determine the status of other cells. In an example, a lead cell may be any cell in a cell group.

In an example implementation, when a UE is not capable of receiving downlink signals in a group at certain time, the UE may not decode downlink signals of cells of a group at that certain time. The UE may not blind decode the downlink cell and/or search for downlink signals. The UE may not expect to receive and monitor downlink signals such as synchronization signals, DRS, control channels (PCFICH, PDCCH, ePDCCH, PDSCH, and/or CRS, etc). This may reduce the battery power consumption in the UE, since the UE may not decode the receive signals. For example, the UE may turn off the receiver on one or more cells in a group. The UE may selectively monitor downlink signals/channels of a subframe based on downlink and uplink transmissions in another cell in the group.

Figure 15:
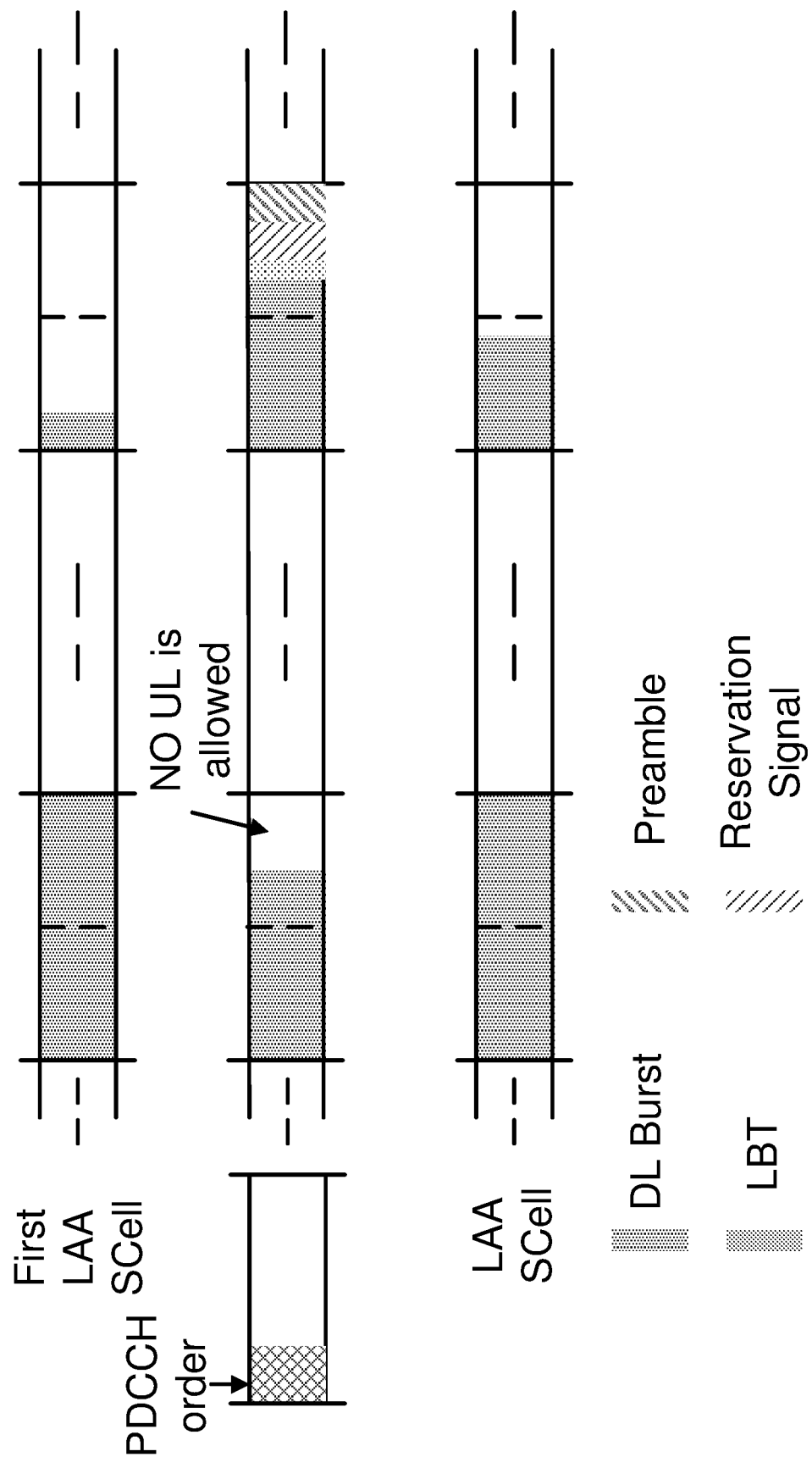
FIG. 15 is an example diagram depicting various signal transmissions as per an aspect of an embodiment of the present disclosure.

In an example, the UE may not be capable of simultaneous reception and transmission in a group of LAA secondary cells. The UE may consider one or more of the LAA secondary cells as a first LAA secondary cell(s) based on a number of criteria. The LAA secondary cell for which the PDCCH order has been transmitted may not be the first LAA secondary cell. The UE may transmit the preamble during the time periods that the first LAA secondary cell is not receiving downlink data. An example is shown in FIG. 15. In an example, a UE may not transmit a random access preamble in the uplink of an LAA cell during a time it is receiving downlink signals in one or more other LAA cells of a group of LAA cells.

Figure 16:
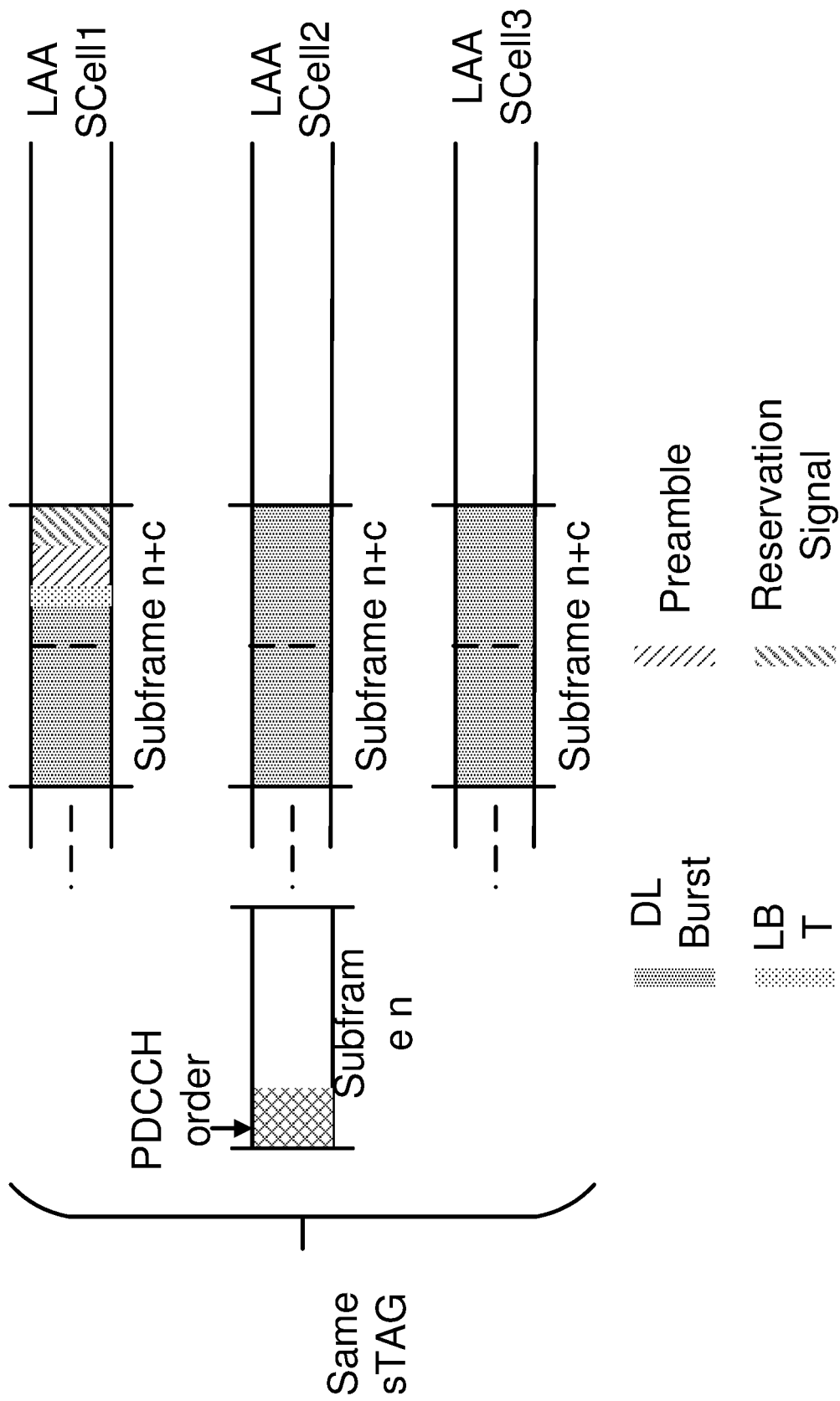
FIG. 16 is an example diagram depicting various signal transmissions as per an aspect of an embodiment of the present disclosure.

In an example embodiment with multiple LAA secondary cells, a UE may be configured to transmit a preamble format 4, or may be configured to transmit a preamble with one of the formats 0-3 (e.g. preamble format 0), or may be configured to transmit a preamble with a format that is more suitable for the first transmission opportunity on a LAA secondary cell in response to a PDCCH order transmitted by eNB (e.g. preamble 0 or 4). A UE may choose to transmit the preamble on one of one or more activated LAA secondary cells in the same timing advance group when the opportunity for preamble transmission on an activated LAA secondary cell in the same timing advance group becomes available. An example is shown in FIG. 16.

Figure 17:
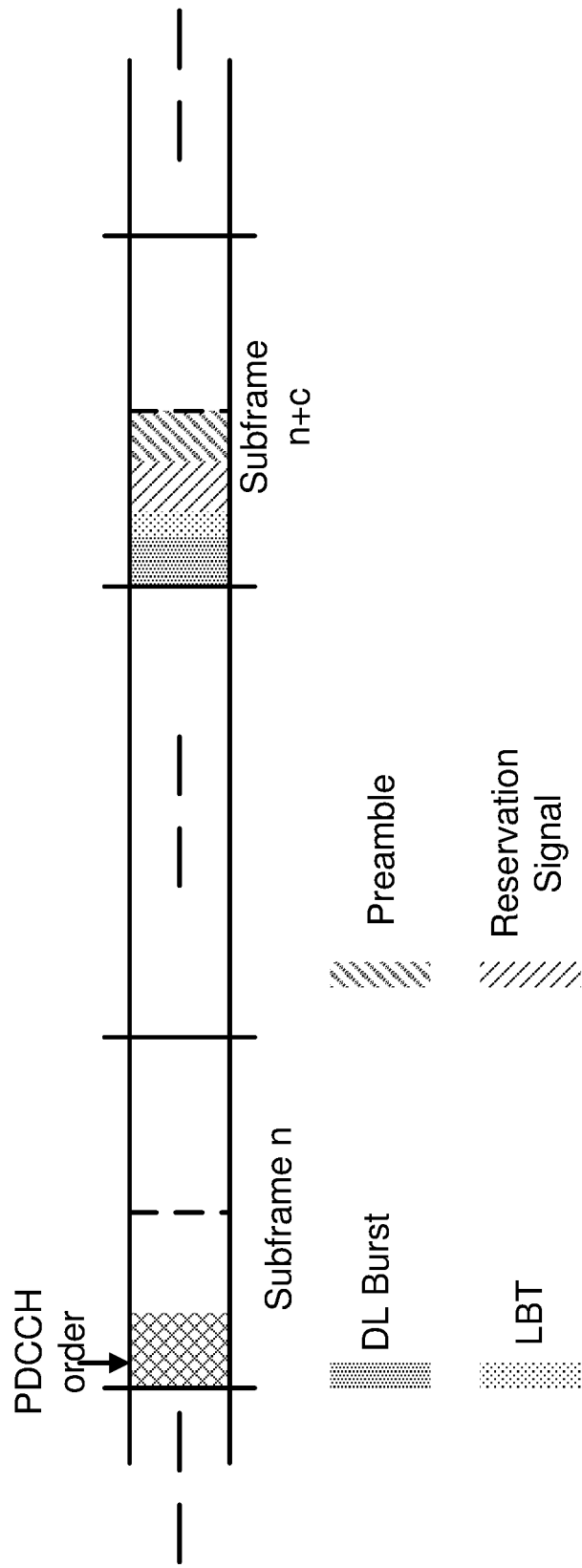
FIG. 17 is an example diagram depicting various signal transmissions as per an aspect of an embodiment of the present disclosure.

In an example embodiment, a UE may be configured to time align the end of preamble format 4 with slot boundary instead of subframe boundary. This may be beneficial when the last subframe of DL burst is a partial subframe with a small number of symbols (e.g., 3 symbols or less). The UE may perform LBT and transmit a preamble in the first slot of subframe and potentially avoid transmitting a reservation signal or the UE may transmit a short reservation signal. An example is shown in FIG. 17.

In an example, a method may be used that comprises receiving by a wireless device an RRC message configuring an unlicensed cell; receiving a PDCCH order to transmit a random access preamble on the unlicensed cell; and transmitting in a subframe the random access preamble, wherein the subframe is a first available subframe after a downlink transmission burst ended. In an example, the first available subframe may be an end partial subframe when a burst transmission duration of the end partial subframe is below a threshold value and a preamble format 4 may be transmitted. In an example, the first available subframe may be a subframe subsequent to an end full subframe and/or an end partial subframe when a burst transmission duration of the end partial subframe is above a threshold value.

In an example embodiment, an RRC configuration index may be employed for determining subframe configuration (indicating which subframes are used for PRACH) for LAA PRACH resources. In an example embodiment, RRC may configure PRACH resources for transmission of a random access preamble. Unlike licensed cells, a subframe for PRACH resource may not be available for uplink transmission for many reasons. For example, PRACH subframe may not be available when an eNB transmits downlink burst on the LAA cell (or any other LAA cell of a group of LAA cells) during a PRACH subframe in the unlicensed cell with configured PRACH. In an example, PRACH subframe may not be available when the eNB transmits a downlink burst during a PRACH subframe on another cell (e.g. of a group, e.g. unlicensed cell in the same band). The UE may not be capable of simultaneous reception and transmission in the aggregated cells.

In an example embodiment, a UE may transmit a random access preamble on a configured PRACH resource if the criteria for the preamble transmission have been met (e.g., UE has completed LBT and/or has gained access to the channel). An eNB may or may not take into account the presence of a PRACH resource on a particular subframe in its downlink scheduling. In an example, an eNB may provide PRACH subframe configuration in an RRC message for an licensed cell cell. The eNB may not provide PRACH subframe configuration in an RRC message for an LAA cell. A subframe may be selected by a UE for random access preamble transmissions per one or more example embodiments.

Figure 18:
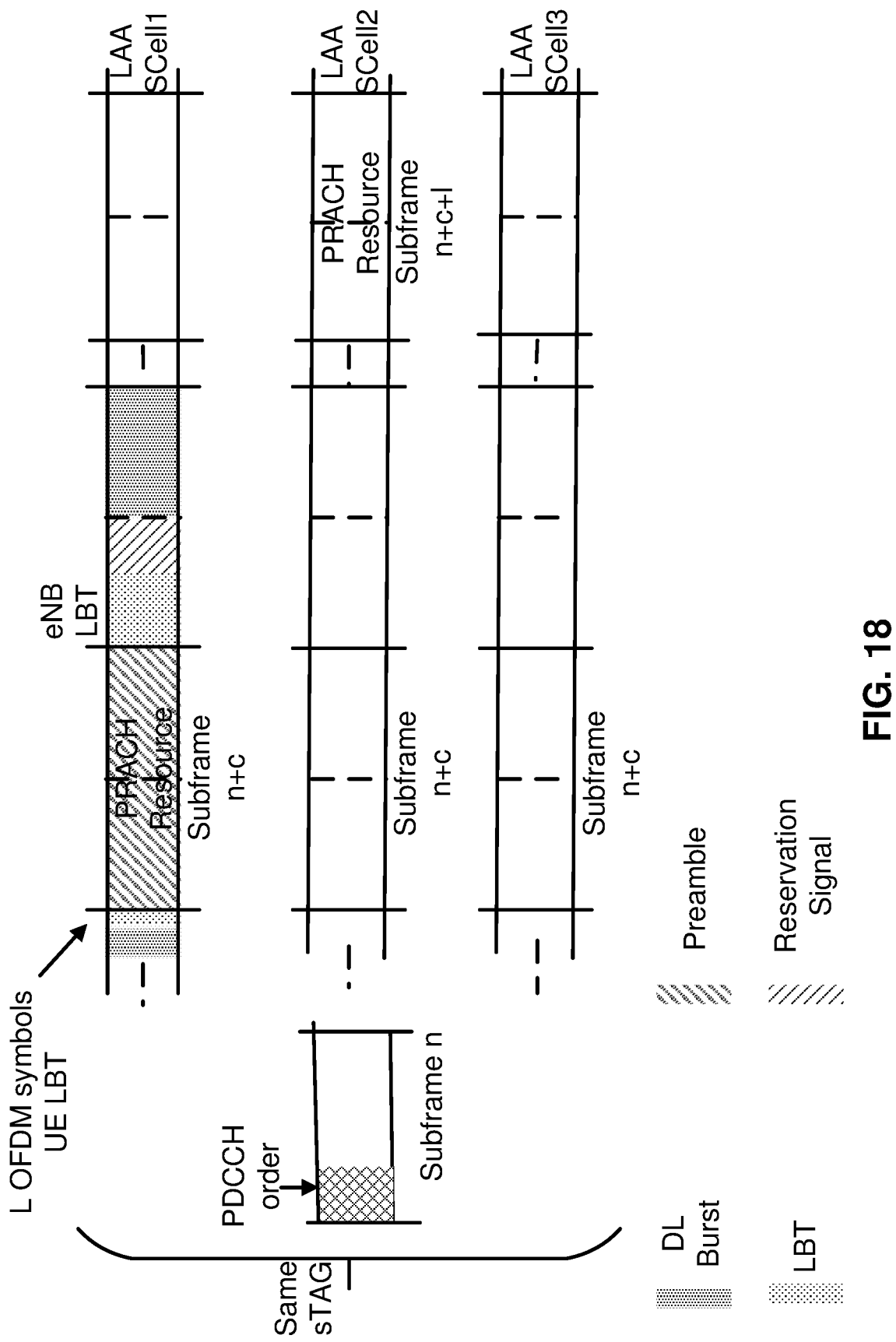
FIG. 18 is an example diagram depicting various signal transmissions as per an aspect of an embodiment of the present disclosure.

In another example, the eNB may provide PRACH subframe configuration in an RRC message for an LAA cell. In an example embodiment, an eNB may stop the downlink burst transmission so that PRACH resource meets random access transmission criteria. An eNB MAC scheduler may stop the downlink burst prior to a PRACH resource, for example when a PRACH process is pending. If an eNB sends PDCCH order to a UE at subframe n for transmission of a random access preamble, for PRACH resources that are available according to the PRACH configuration in subframes n+x (e.g. x>=6), the eNB may stop transmission L OFDM symbols (or L micro seconds) before a configured PRACH resource on the same LAA secondary cell or any other activated LAA secondary cell in the same timing advanced group. Value of L may depend on an implementation of UL LBT for PRACH and may be configurable via RRC signaling. An example is shown in FIG. 18.

In an example embodiment, if an eNB sends a PDCCH order to a UE at subframe n to send the random access preamble, for PRACH resources that are available according to the PRACH configuration in subframes n+x (e.g. x>=6), and if the UE is capable of sub-band LBT (e.g., LBT that can be performed on subsets of the entire bandwidth), the eNB may avoid scheduling downlink transmission L OFDM symbols and on the frequency band where LBT is performed and includes the resource blocks corresponding to the PRACH resources.

In an example embodiment with multiple LAA SCells where a UE is configured to transmit preamble on a given LAA SCell, a UE may update a counter with the number of times that preamble transmission was held back due to unsuccessful LBT. The UE may inform eNB about the value of this counter (e.g., on PUCCH/PUSCH of PCell or PUSCH of another SCell). In an example, the UE may autonomously switch to a different cell in the same TAG using for example the same PRACH resources that were configured in the first LAA SCell when the counter is above a threshold. In an example, an eNB may take into account the value of this counter and change the PRACH configuration index for the SCell. In an example, an eNB may take into account the value of this counter and send a PDCCH order to initiate random access on a different LAA SCell in the same TAG.

Figure 19:
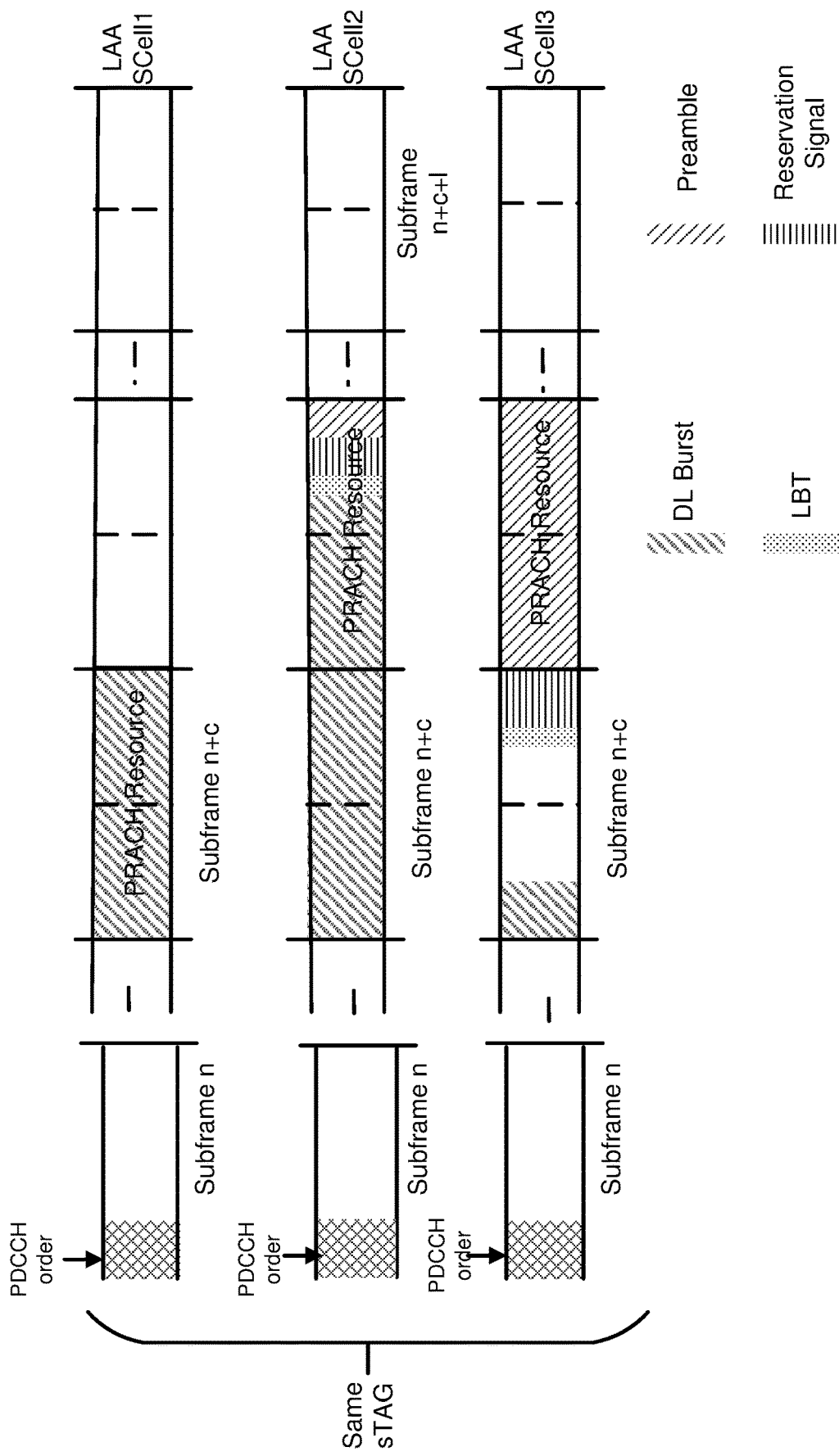
FIG. 19 is an example diagram depicting various signal transmissions as per an aspect of an embodiment of the present disclosure.

In an example embodiment with multiple LAA SCells, an eNB RRC configures the PRACH resources on a set of active LAA Scells (e.g., with PDCCH on PCell or separately with PDCCHs on the LAA SCells) that are active and are within the same TAG. eNB may choose similar or different PRACH configuration indices for different configured carriers. In an example, a UE may transmit the preamble on any PRACH opportunity available on any of the cells within the TAG. In this example, a UE may choose to transmit multiple preambles in the same subframe. In an example, a UE may choose to transmit a single preamble in a subframe based on a number of criteria. A UE may not attempt to re-transmit a preamble after successful transmission of a preamble. A UE may resume preamble transmission using the same procedure as above if no RAR is received on PCell within a configurable time window. An Example PDCCH order and preamble transmission is shown in FIG. 19.

In an example implementation, a UE may transmit preamble format 4 as described in example implementations. An eNB may send a PDCCH order to initiate a random access process for a UE at subframe n. The UE may determine (e.g., from common PDCCH signaling or blind decoding) that subframe n+x (x>=1) is at least one of the following: DL partial subframe, full DL subframe, an empty subframe, or an uplink subframe.

In an example, a UE may determine that subframe n+x (x>=1) is a DL partial subframe and the number of DL symbols. The subframe may be used for preamble transmission depending on the implementation.

In an example, if x>=c and the partial subframe has at most 10 OFDM symbols, the subframe may be used for preamble transmission. The UE may send a signature reservation signal (e.g., a reservation signal containing the UE information) until it sends the preamble in the same subframe. If the UE gains access to the channel after the starting time of preamble, and if long channel reservation (e.g., roughly 1 ms) is allowed, the UE may send a signature reservation signal until it sends the preamble in the next subframe. In an example, if preamble format 4 is allowed to end at slot boundary, the duration of reservation signal may be shorter.

In an example, if x>=c and the partial subframe has more than 10 OFDM symbols, the subframe may be used for LBT and channel reservation and the subsequent subframe may be used for preamble transmission if long channel reservation (e.g., roughly 1 ms or 0.5 ms if preamble format 4 can end at slot boundaries) is allowed. In case long channel reservation is allowed, a UE may start LBT either (i) immediately after the downlink burst, or (ii) w microseconds before the end of subframe. If a UE gains access to the channel, the UE may send a signature reservation signal until it sends the preamble in the next subframe.

In an example, a UE may determine that subframe n+x (x>=1) is a full DL subframe, in which case it may not be used for preamble transmission and/or LBT/channel reservation.

In an example, a UE may determine that subframe n+x (x>=1) is an empty subframe, in which case it may be used for the uplink transmission. In an example, if x>=c, the UE may start LBT at w microseconds before the end of the subframe and if the UE gains access to the channel before the starting time of the preamble, the UE sends a signature reservation signal until the UE sends the preamble in the same subframe. If a UE gains access to the channel after the starting time of preamble, and if long channel reservation (e.g., roughly 1 ms 0.5 ms if preamble format 4 can end at slot boundaries) is allowed, the UE may send a signature reservation signal until it sends the preamble in the next subframe.

In an example, a UE may determine that subframe n+x (x>=1) is an uplink subframe. If x>=c, transmit data or reservation signal before the starting point of preamble transmission and then send the preamble in the same subframe.

In an example implementation, a UE may transmit one of the preamble formats 0 to 3 as described in example implementations. An eNB may send PDCCH order for initiating the random access to the UE at subframe n. The UE may determine (e.g., from common PDCCH signaling or blind decoding) if subframe n+x (x>=1) is one of the following: DL partial subframe, full DL subframe, an empty subframe or an UL subframe.

In an example, the UE may determine that subframe n+x is a DL partial subframe. In an example, if x>=c−1, UE may start the LBT either (i) immediately after the DL burst, or (ii) w microseconds before the end of subframe. If the UE gains access to the channel, the UE may send a signature reservation signal until the end of subframe and may transmit preamble at the next subframe.

In an example, the UE may determine that subframe n+x is a full DL subframe, in which case it may not be used for preamble transmission. The next subframe also may not be used for PRACH, because the UE needs to switch and possibly perform LBT.

In an example, the UE may determine that subframe n+x is an empty subframe, in which case the subframe can be used for the uplink transmission. In an example, if x>=c and the UE has gained access to and may have reserved the channel in the last subframe, the UE may transmit a preamble. In an example, if the UE has not gained access to and/or reserved the channel in the last subframe and x>=c−1, the UE may perform LBT w microseconds before the end of the subframe. In an example, if UE gains access to the channel, it may send a signature reservation signal until the end of the subframe. It may then send the preamble in the next subframe.

In an example, the UE may determine that subframe n+x is an UL subframe. In an example, if x>=c, UE may send the preamble.

In an example embodiment, a UE may transmit one of preamble configurations 0 to 4. In an example, a UE may select from one of the preamble format 0 to 4. In an example, the eNB may select preamble format 0 or 4. The eNB may send PDCCH order for initiating the random access to the UE at subframe n. The UE may determine (e.g., from common PDCCH signaling or blind decoding) if subframe n+x (x>=1) is one of the following: DL partial subframe, full DL subframe, an empty subframe or an UL subframe.

In an example, the UE may determine that subframe n+x is a DL partial subframe and if so, the number of OFDM symbols. In an example, if x>=c and the partial subframe has at most 10 OFDM symbols, the subframe may be used for preamble transmission. The UE may start LBT either (i) immediately after the downlink burst, or (ii) w microseconds before the end of subframe. If the UE gains access to the channel before the starting time of preamble format 4, the UE may send a signature reservation until it sends the preamble (format 4) in the same subframe. If the UE gains access to the channel after the starting time of preamble format 4 but before the end of subframe, the UE may send a signature reservation signal until the end of subframe and sends the preamble (format 0-3) in the next subframe.

In an example, if x>=c and the partial subframe has more than 10 OFDM symbols, the UE may start LBT either (i) immediately after the downlink burst, or (ii) w microseconds before the end of subframe. If the UE gains access to the channel, the UE may send a signature reservation until the end of subframe and may transmit the preamble (format 0-3) in the next subframe.

In an example, if x=c−1, the UE may start LBT either (i) immediately after the downlink burst, or (ii) w microseconds before the end of subframe. If the UE gains access to the channel, the UE sends a signature reservation until the UE sends the preamble in the next subframe.

In an example, the UE may determine that subframe n+x is a full DL subframe, in which case it cannot be used for preamble transmission. The next subframe may be used for transmission of preamble format 4.

In an example, the UE may determine that subframe n+x is an empty subframe. In an example, if x>=c and UE has gained access to and reserved the channel in the last subframe, the UE may transmit a preamble (format 0-3). In an example, if a UE has not gained access to and/or reserved the channel in the last subframe and x>=c, UE may perform LBT w microseconds before the end of the subframe (or slot boundary if preamble format 4 can end at slot boundaries).

Once UE gains access to the channel, the UE may send a signature reservation signal until it sends preamble (format 4) in the same subframe. In an example, if x=c−1, UE may perform LBT w microseconds before the end of the subframe. Once UE gains access to the channel, the UE may send a signature reservation signal until the UE sends the preamble in the next subframe.

In an example, the UE may determine that subframe n+x is an UL subframe. In an example, if x>=c, the UE sends the preamble.

In an example embodiment, if multiple LAA SCells in the same time advance group are activated, the UE may transmit the random access preamble in any of the SCells as soon as it finds the opportunity.

In an example, the eNB may send PDCCH order for initiating the random access to the UE at subframe n. The UE may determine (e.g., from common PDCCH signaling or blind decoding) if subframe n+x (x>=1) in any of the SCells of the same timing advance group is a DL partial subframe, full DL subframe, an empty subframe or an UL subframe.

In an example, if x>=c and there is opportunity for preamble transmission in any of SCells, the UE may transmit a preamble the Scell.

In an example, if at a given subframe, there is an opportunity for preamble transmission on multiple LAA SCells, the UE may send multiple preambles on different LAA SCells and at the same subframe.

In an example, if at a given subframe, there is an opportunity for preamble transmission on multiple LAA SCells, the UE may select to transmit a single preamble on only one of the LAA SCells based on some criteria. For example, if the UE can send a preamble format 4 on one LAA SCell and preamble format 0 on another LAA SCell, the UE may select to transmit preamble format 0 only.

In an example, if a UE has not received signaling regarding next subframe, the UE may determine that the subframe may be either empty or a full DL subframe.

In an example, a UE may determine from common PDCCH signaling if the next subframe is a DL partial subframe. The subframe may be used for LBT and transmission of random access preamble format 4 and/or channel reservation for transmission of random access preamble in the subsequent subframe.

Depending on implementation and/or preamble format a UE may or may not transmit reservation or signature signals before the preamble transmission.

If there is no DCI information, the UE may perform blind decoding at the beginning of subframe n+x to see if there is any DL transmission. If so, the UE may determine that subframe n+x is a full DL subframe.

If blind decoding is not successful, then subframe n+x may be one of the following: blank, or occupied by other base stations.

In an example, the UE may start the LBT process right after the end of a DL burst. If the UE gains access to the channel, the UE may transmit a reservation signal until the beginning of a preamble transmission.

A UE may start the LBT at min {w us, (1 ms-duration of DL transmission)} before the end of subframe. If the UE gains access to the channel, the UE may send a reservation signal until the beginning of preamble transmission.

A UE may not start the LBT until slot boundary (even if partial DL subframe ends before the slot boundary or even if the subframe is empty). If the UE gains access to channel, the UE may send a signature reservation signal until preamble transmission.

In an example embodiment, an enhanced double LBT mechanism may be implemented to improve PRACH transmission.

In an example, a UE may perform LBT right after the end of DL burst.

In an example, if UE gains access to the channel before the slot boundary, the UE may send a signature reservation signal until the slot boundary. The eNB may or may not honor this reservation signal. The UE may start LBT at the slot boundary to verify if the eNB is transmitting. If the eNB is not transmitting after the slot boundary, the UE continues sending the reservation signal until the end of the subframe (SF) and sends the preamble (format 0-3) at the beginning of next SF n. If the eNB transmits after the slot boundary, the UE may not transmit a reservation signal after the slot boundary and may not be able to transmit the preamble in the next subframe.

In an example, if a UE gains access to the channel before the slot boundary, the UE sends a signature reservation signal until the slot boundary. The eNB may or may not honor this reservation signal. The UE may start LBT at the slot boundary to verify if the eNB is transmitting. If the eNB is not transmitting after the slot boundary, the UE may continue sending the reservation signal until the UE transmits preamble (format 4) aligned with the end of the subframe. If the eNB transmits after the slot boundary, the UE may not transmit a reservation signal after the slot boundary and may not be able to transmit the preamble in the subframe.

In an example, if the end subframe of a DL transmission burst on an LAA cell is a partial subframe, the number of DL symbols in the partial subframe (e.g., the duration of DwPTS) may be indicated with common DCI to the UEs for which the LAA cell is active. In an implementation, the eNB may signal additional UpPTS symbols in the partial subframe (e.g., the value of X in FIG. 11). The value of X may be selected from a set (e.g., {0, 2, 4}). In an example, if the eNB does not indicate the value of X, the UE may assume its value is 0. The signaling may be UE-specific (e.g., using RRC configuration and/or UE-specific DCI) or may be with common DCI (e.g., indicated with the common DCI that includes information on duration of DwPTS and/or common DCI transmitted on PCell and/or with common DCI transmitted on a different carrier).

In an example implementation, a UE may be triggered to transmit a random access preamble (RAP). The UE may transmit the preamble in the uplink portion of a DL partial subframe with appropriately selected duration that fits in the UpPTS. The UE may consider the duration of LBT and/or DL/UL switching time when choosing the preamble. In an implementation, the eNB may signal to the UE the duration of RAP to be transmitted in UpPTS and/or an UL subframe. The signaling may include the information on the sequence to be used for generation of RAP, the number of SC-FDMA symbols to be used for transmission of RAP, the starting position and ending position of RAP, the type and/or duration of LBT before transmission of RAP, the frequency resources to be used.

In an example, an eNB may signal to a UE or a UE may autonomously select the preamble format and/or the preamble duration and/or sequence to be used for generation of the preamble and/or other parameters related to RAP and its transmission (e.g., the time and frequency resources, the LBT parameters, etc.). In an implementation, the eNB may indicate to the UE or the UE may be configured with the parameter DELTA_PREAMBLE that may be a power offset value and may be used for calculating the transmission power of RAP. The signaling may be with RRC, UE-specific DCI or common DCI. The value of DELTA_PREAMBLE may depend on the time duration of RAP, RAP format and/or other parameters. In an example, preamble durations in LAA may be different from 3GPP release 13 preamble durations and/or may be variable. In an example, the parameter DELTA_PREAMBLE may be used by the MAC entity to calculate the PREAMBLE_RECEIVED_TARGET_POWER as: PREAMBLE_RECEIVED_TARGET_POWER= preambleInitialReceivedTargetPower+DELTA_PREAMBLE+(PREAMBLE_TRANSMISSION_COUNTER−1)*powerRampingStep.

In an example, the values of DELTA_PREAMBLE may be as shown in FIG. 21.

In an example implementation, the UE may transmit or attempt to transmit (e.g., transmit subject to successful completion of LBT) one or more RAP with format 4 and/or RAP with duration that fits in the UpPTS. In an example, the UE may be configured to transmit a short preamble format (e.g., sub one millisecond such as format 4 RAP) at pre-specified/configured positions within the UpPTS. In an example, eNB may signal to the UE the position(s) that UE may transmit the RAP within the UpPTS. The signaling may be by RRC configuration and/or common DCI and/or UE-specific DCI.

In an example embodiment, a UE may transmit a RAP or attempt to transmit a RAP (e.g., transmit subject to successful completion of LBT) for one or more times within a configured window of time. The time window may be configured with RRC and/or common DCI and/or UE-specific DCI. In an example, the UE may transmit or attempt to transmit (e.g., subject to successful completion of LBT) a short preamble (e.g., sub one millisecond such as preamble format 4) for one or more times within the UpPTS. In an example, the repeated RAP transmissions may occur consecutively and/or without gap between the RAP transmissions. In an example, the consecutive RAP transmissions may be preceded with LBT. The number of repetitions of RAP may be configured by RRC and/or UE-specific DCI and/or common DCI.

In an example embodiment, a UE may transmit a RAP for more than one time. In an example, the frequency and/or subframe index used for RA-RNTI calculation (e.g., t_id and f_id) may be different for different RAP transmissions. In an example, the UE may calculate the RA-RNTI for transmitted RAPs. The UE may stop monitoring the PDCCH for random access response(s) when the UE receives a random access response identified by one of the calculated RA-RNTI values.

In an example, where a UE may transmit a RAP for more than one time on a LAA cell, the UE may calculate the transmission power for the first transmission of RAP and use the same power level for subsequent transmissions of the RAP.

In an example, more than one random access procedures may be performed in parallel on more than one unlicensed carriers within the same TAG. The one or more unlicensed carriers may transmit the RAP with the RAP index indicated in the PDCCH order. Once one successful random access response (RAR) may be detected by UE. The UE may use the TA indicated by the RAR for all unlicensed carriers within the TAG and stops transmitting preambles on other unlicensed carriers.

In an example, where more than one random access procedure may be performed in parallel on more than one unlicensed carriers within the same TAG, once the UE transmits a preamble on one of the LAA carriers, the UE may pause the random access processes on other LAA carriers. If the UE receives the RAR corresponding to the transmitted preamble, the UE may use the TA indicated by the RAR for all unlicensed carriers within the TAG and stops the random access processes. In an example, if the UE does not receive the RAR corresponding to the transmitted preamble, the UE may resume the random access processes.

In an example, where more than one random access procedure may be performed in parallel on more than one unlicensed carriers within the same TAG, if two or more LAA carriers have PRACH resource at the same subframe and LBT passes on more than one carrier such that the RA-RNTI for the more than one carrier may be the same, the UE may transmit the RAP on one of the more than one carrier. In an example, the one of the more than one carrier may be the carrier with smallest cell index.

In an example, where more than one random access procedure may be performed in parallel on more than one unlicensed carriers within the same TAG, the UE may use the same RRC configured value PreambleTransMax for the unlicensed carriers that random access procedures are performed. In an example, an eNB may configure different values of PreambleTransMax for the unlicensed carriers within the TAG that a random access procedure is performed.

In an example implementation, different sets of values for PreambleTransMax may be configured for LAA cells and licensed cells. In an example, the set of values for PreambleTransMax may be larger in LAA cells compared to licensed cells.

In an example implementation, where more than one random access procedure may be performed in parallel on more than one unlicensed carriers within the same TAG, a UE may maintain separate preamble transmission counters for different random access procedures. In an example, a UE may share the preamble transmission counter across the multiple unlicensed carriers that the random access procedures are run in parallel.

In an example embodiment, one random access procedure may be shared across one or more unlicensed carriers within the same TAG. PRACH resources may be staggered in the time domain on the unlicensed carriers. UE may perform LBT on the unlicensed carrier which may have the earliest PRACH resource. If LBT busy occurs, UE may perform LBT on next unlicensed carrier until finding one LBT-idle carrier to transmit the RA preamble. After the successful transmission of the preamble, UE may try to decode RAR during the RAR window and may stop transmitting preamble on other carriers. If the RAR is successfully received by UE, the UE may use the TA indicated by the RAR for all unlicensed carriers within the TAG; otherwise UE may resume the cross-unlicensed carrier transmission of RA preamble, e.g. performs LBT on the next unlicensed carrier having the earliest PRACH resource.

In an example, where one random access procedure may be shared across one or more unlicensed carriers, the transmission power of PRACH may be calculated separately for each LAA cell as PPRACH=min$\{P_{CMAX,c}(i)$, PREAMBLE_RECEIVED_TARGET_POWER+$PL_c\}$_[dBm], where $P_{CMAX,c}(i)$ is the configured UE transmit power for subframe i of serving cell c and $PL_c$ is the downlink path loss estimate calculated in the UE for serving cell c.

In an example, where one random access procedure may be shared across one or more unlicensed carriers, a UE may use a single preamble transmission counter for the random access procedure across the multiple unlicensed carriers within the TAG.

In an example, where one random access procedure may be shared across one or more unlicensed carriers, the UE may use the RRC configured value PreambleTransMax for the random access procedure across the unlicensed carriers within the TAG. In an example where PreambleTransMax is separately configured for the unlicensed carriers that share the same random access procedure, the UE may choose one of the configure PreambleTransMax values. In an example, the one of the one of the configure PreambleTransMax values may be the largest PreambleTransMax value. In an example, the one of the one of the configure PreambleTransMax values may be the PreambleTransMax corresponding to the LAA cell with the smallest cell index.

In an example, where one random access procedure may be shared across one or more unlicensed carriers, if two or more LAA carriers have PRACH resource at the same subframe, UE may perform LBT at the two or more LAA carriers and if LBT passes on more than one LAA cell, UE may transmit PRACH at one of the more than one LAA cells. In an example, the one of the more than one LAA cells may be the LAA cell with smallest cell index.

In an example, the UL grant in RAR may be applied to the LAA cell that received the PDCCH order for initiating the random access procedure even if the RAP was transmitted on a LAA carrier other than the carrier triggered for PRACH.

In an example, the eNB may RRC configure different values or sets of values for random access response windows (ra-ResponseWindowSize) for LAA cells and for licensed cells. In an example, eNB may configure a larger random access response window size for LAA cells compared to licensed cells.

In an example, the eNB may RRC configure different values or sets of values of preambleInitialReceivedTargetPower for LAA cells and for licensed cells. In an example, eNB may configure a larger value of preambleInitialReceivedTargetPower for LAA cells compared to licensed cells.

In an example, eNB may RRC configure the parameter powerRampingStep differently on LAA cells and licensed cells. In an example the set of values for powerRampingStep may take higher values on LAA cells compared to licensed cells.

In an example, the eNB and the UE may start a timer at the subframe that the PDCCH order for triggering the PRACH is sent on a LAA cell. In an example, the eNB may configure the timer at the UE with RRC or UE-specific DCI or common DCI. In an example, after the timer expires, the eNB may reuse the preamble for triggering a new PRACH process. In an example, the UE may cancel the PRACH process after the timer expires. In an example, the eNB may withhold reusing the preamble for a new PRACH process if the timer expires and the UE transmits a preamble before the timer expires and the eNB has not completed processing and transmitting the RAR before the timer expires. In an example, the eNB may transmit the RAR after the timer expires if eNB did not have enough time to process the RAR before the timer expires. In an example, the UE may continue with the PRACH process if the UE transmits the preamble before the timer expires and the PDCCH monitoring period for RAR (e.g., 3+ 'random access response window size' subframes after the preamble is transmitted by the UE) has not expired.

In LTE release 13 specification, the PRACH transmission may be based on DL timing. A UE may have no additional UL synchronization information and/or may have not received TA (timing advance) command from the eNB. The PRACH may be transmitted with TA=0. The PUSCH/PUCCH timing of other UEs in the same cell may be adjusted based on the TA command received from eNB. The PUSCH/PUCCH transmission of intra-cell UEs may block PRACH transmission in the same subframe, since the UE with PRACH transmission may detect the power of timing-advanced PUSCH/PUCCH transmission of other UEs during the CCA measurement window. Due to larger propagation delay, the TA value for the UEs that are located in the cell edge and are transmitting PUSCH/PUCCH may be relatively larger than UEs with closer proximity to the eNB. When two or more UEs are located in the cell edge and one or more of them attempts to transmit PRACH with TA=0 and the one or more UEs at the cell edge is transmitting PUSCH/PUCCH, the LBT of the UE(s) that attempt(s) to transmit PRACH may not be successful due to the time-advanced PUSCH/PUCH transmission of other UE(s) with relatively large TA. Within a CCA slot (9 μs), the UE may need to detect the power (CCA measurement) in at least 4 μs window. If the measurement window is at the very end of the CCA slot duration, the mentioned block issue may have higher chance to happen.

In an example embodiment, a fixed TA offset for PRACH may be configured by the eNB. In an example, the TA offset value may be configured by RRC. In an example, the PDCCH order that may be used for triggering the PRACH on the LAA cell may determine a time shift that UE may use for PRACH transmission instead of TA=0. In an example, the signaling for TA offset may be through a UE-specific DCI. Upon receiving the timing advance command from the eNB in the RAR, the UE may adjust the timing of the cells within the TAG considering the difference between the TA command in the RAR and the timing advance used for transmission of PRACH (e.g., timing advance indicated to the UE for PRACH transmission) and use this difference value for PUSCH/PUCCH transmission on the LAA cells within the same TAG.

In an example embodiment, the MAC entity may have a configurable timer timeAlignmentTimer per TAG. The timeAlignmentTimer may be used to control how long the MAC entity considers the Serving Cells belonging to the associated TAG to be uplink time aligned. In an example, a MAC entity may store or maintain $N_{TA}$ for LAA cell upon expiry of associated timeAlignmentTimer, where $N_{TA}$ may be defined as the timing offset between uplink and downlink timing in terms of the number of basic time units (e.g., Ts=1/(15000×2048) seconds). A UE may use the latest stored $N_{TA}$ value associated with the LAA cell for the purpose of PRACH transmission on a LAA cell. Upon receiving the timing advance command from the eNB in the RAR, the UE may adjust the timing of the cells within the TAG considering the difference between the TA command in the RAR and the timing advance used for transmission of PRACH (e.g., $N_{TA}$*Ts where $N_{TA}$ is the latest stored $N_{TA}$ value) and use this difference value for PUSCH/PUCCH transmission on the LAA cells within the same TAG.

In an example embodiment, a UE may use the value of TA for PCell for the purpose of PRACH transmission on a LAA cell. Upon receiving the timing advance command from the eNB in RAR, the UE may adjust its timing relative to the timing used for transmission of PRACH (e.g. timing advanced as much the TA of PCell). Upon receiving the timing advance command from the eNB in the RAR, the UE may adjust the timing of the cells within the TAG considering the difference between the TA command in the RAR and the timing advance used for transmission of PRACH (e.g., timing advance for the PCell) and use this difference value for PUSCH/PUCCH transmission on the LAA cells within the same TAG.

In an example, eNB may indicate to the UE whether to use the latest stored $N_{TA}$ or use the TA for PCell for transmission of PRACH. The indication may be in form RRC configuration, or UE specific DCI or common DCI. In an example, eNB may indicate to the UE whether to use the latest stored $N_{TA}$ or use the TA for PCell for transmission of PRACH in the PDCCH order used for triggering the PRACH on the LAA cell.

In an example, the PRACH resources may be configured for multiple LAA cells with the same TAG. The frequency resources may be configured by RRC. In an example, 0 to n Interlaces may be configured. In an example, PRACH subframes may be configured by RRC. UE may transmit PRACH on such subframes if they are not used in the Downlink and if they pass LBT test. In an example, Partial UL subframes following end partial downlink subframes may also be used by UE as PRACH subframes, if directed by eNB, even if they are not configured as part of periodic PRACH configuration.

In an example, RA-RNTI for frame structure type 3 may be calculated based on TDD equation where f_id may refer to interlace index. The RA-RNTI may be independent of which LAA cell UE is using to transmit PRACH if UE is only allowed to transmit one PRACH in a given subframe/interlace.

In an example, the RA-RNTI associated with the PRACH in which the Random Access Preamble is transmitted, may be computed as RA-RNTI=1+t_id+10*f_id, where t_id may be the index of the first subframe of the specified PRACH (0≤t_id<10), and f_id may be the index of the specified PRACH within that subframe, in ascending order of frequency domain (0≤f_id<n) except for bandwidth reduced low complexity UEs or UEs in enhanced coverage. For these UEs, RA-RNTI associated with the PRACH in which the Random Access Preamble is transmitted, may be computed as:

$$RA\text{-}RNTI=1+t\_id+10*f\_id+n*10*(SFN\_id \bmod(W \max/10))$$

where t_id may be the index of the first subframe of the specified PRACH (0≤t_id<10), f_id may be the index of the specified PRACH within that subframe, in ascending order of frequency domain (0≤f_id<n), SFN_id may be the index of the first radio frame of the specified PRACH, and W max is 400, maximum possible RAR window size in subframes for bandwidth reduced low complexity UEs or UEs in enhanced coverage.

In an example embodiment, if UE's LBT for transmission of PRACH fails, the UE may be allowed by eNB to reattempt LBT on up to m following PRACH subframes using the same Interlace index and Preamble sequence. Value of m may be configured at RRC or through DCI signaling as a cell specific or UE specific parameter.

In legacy procedures when a random access process is unsuccessful the wireless device may initiate a radio link failure, the wireless device may re-start the process again, and/or may consider the random access process failed without taking any additional action. In an example, the base station may re-initiate the random access process when a random access process fails. There is a need to enhance the random access process and improve efficiency and reliability of the random access procedure. Example embodiments provide an enhanced mechanism for a random access procedure.

Figure 22:
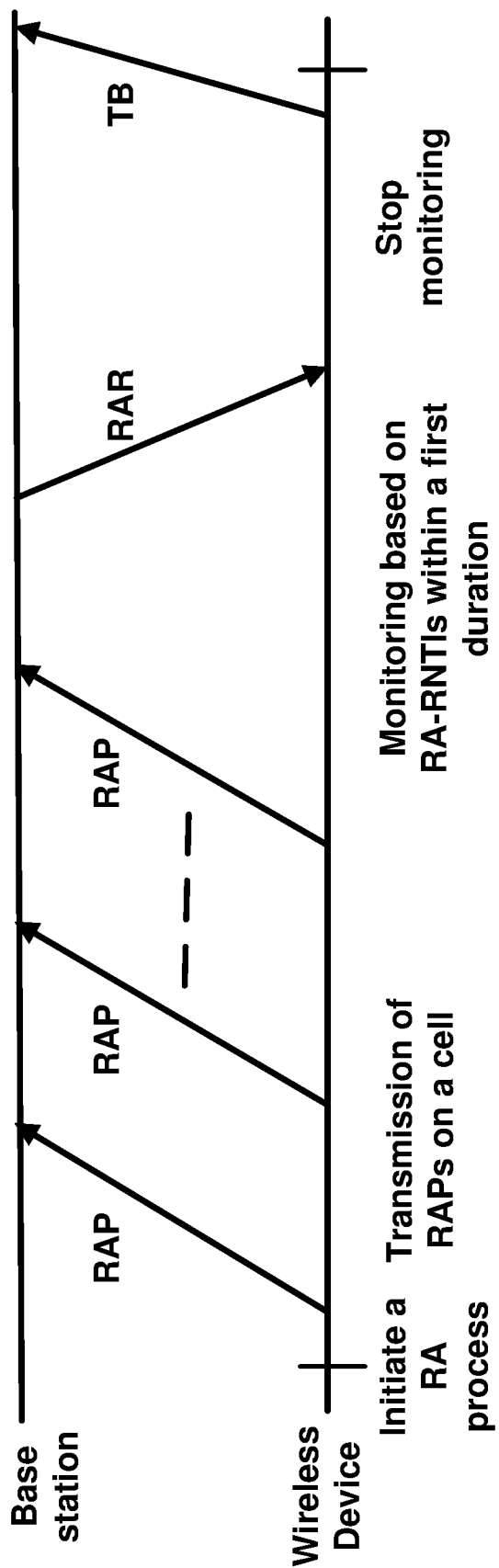
FIG. 22 is an example diagram depicting a random access procedure on a cell as per an aspect of an embodiment of the present disclosure.
Figure 23:
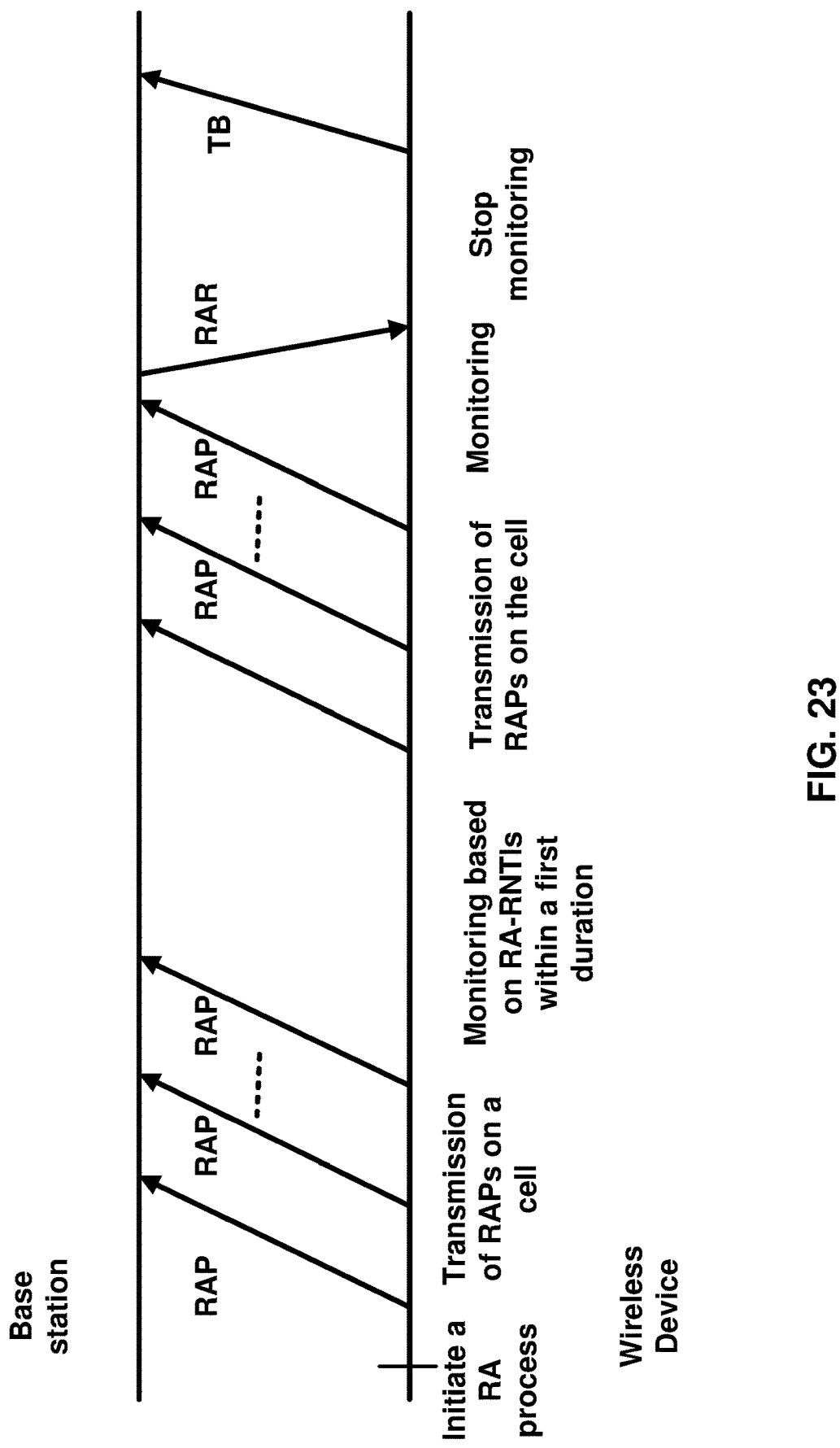
FIG. 23 is an example diagram depicting a random access procedure on a cell as per an aspect of an embodiment of the present disclosure.

In an example embodiment, a wireless device may transmit a plurality of random access preambles (RAPs) on a cell in response to initiating a random access procedure. Example random access procedures are shown in FIG. 22 and FIG. 23. In an example, the random access procedure on the cell may be contention-free. A base station may transmit to a wireless device a PDCCH order configured to initiate a random access procedure on the cell. A PDCCH order initiating the random access procedure may indicate one or more identifiers of the plurality of preambles. In an example, the random access procedure may be contention-based. The random access procedure may be initiated by a MAC entity of the wireless device. In an example, the plurality of RAPs may be transmitted (e.g., as shown in the example in FIG. 22 and the example in FIG. 23) on the cell. The cell may be at least one of a licensed cell or an unlicensed cell. The cell may be in mm-wave frequencies. Other cell types may be considered. In an example, the plurality of preambles may have a same corresponding index/sequence and/or format. In an example, the plurality of preambles may comprise a plurality of indices/sequences and/or formats. The number of repetitions of RAP may be configured by RRC and/or UE-specific DCI and/or common DCI.

In an example embodiment, a UE may transmit a plurality of RAPs, e.g. within a configured window of time. The time window may be configured with RRC and/or common DCI and/or UE-specific DCI. In an example, the UE may transmit a plurality of preambles, e.g., a sub one millisecond preamble such as preamble format 4, or preamble format 1, and/or the like. In an example, the repeated RAP transmissions may occur consecutively. In an example, transmission of a random access preamble may be restricted to certain time and frequency resources of PRACH. In an example, RAP transmissions may occur consecutively and without gap between the RAP transmissions.

Transmission of a plurality of preambles on a cell may increase uplink signaling overhead. However, consecutive transmissions of RAPs on different RACH resources via a cell may increase likelihood of successful reception of at least one RAR during a RAR monitoring phase. This may enhance reliability and probability of completing a successful random access process.

In an example, the PRACH resources may be indicated by RRC and/or in combination of RRC and dynamic signaling (e.g., DCI). In an example, some of the PRACH resource parameters may be indicated by a PDCCH initiating random access. Some of the PRACH resource parameters may be pre-configured. PRACH resources may be enumerated in increasing order of the subframe number within the radio frame and the physical resource blocks in the frequency domain such that index 0 may correspond to the lowest numbered physical resource block and subframe within the radio frame. PRACH resources may be indicated by a PRACH Resource Index. At least one RRC parameter (e.g., prach-ConfigurationIndex) may indicate the PRACH resources in time and frequency domain.

In an example, the plurality of RACH resources may be configured by the base station. In an example, the plurality of RACH resources may be determined/configured by the base station using at least broadcast information. The plurality of RACH resources may be determined using at least information in one or more signals (e.g., synchronization signals). In an example, a combination of broadcast information and/or information in one or more signals (e.g., synchronization signals) and/or RRC and/or dynamic signaling (e.g., DCI) may configure the plurality of RACH resources and/or may be used to determine the plurality of RACH resources. In an example, a PDCCH order initiating the random access procedure may indicate some parameters for configuration of the plurality of RACH resources.

In an example, the frequency and/or subframe index used for RA-RNTI calculation (e.g., t_id and f_id) may be different for different RAP transmissions. The UE may calculate a plurality of RA-RNTIs for transmitted RAPs. In an example, a MAC entity of the UE may monitor a PDCCH for random access response(s) identified by RA-RNTIs corresponding to the RAP transmissions during a first duration (e.g., determined, at least, based on one or more RA response windows). The UE may stop monitoring the PDCCH for random access response(s) when the UE receives at least one random access response identified by at least one of the calculated RA-RNTI values. In an example, the wireless device may determine a plurality of random access radio network temporary identifiers (e.g., RA-RNTIs) corresponding to the plurality of preambles transmitted via PRACH resources. In an example, the determining may be based on the RACH resource (e.g., the time domain and/or the frequency domain location of the RACH resource). In an example, the determining may comprise employing a time ID and/or a frequency ID corresponding to the RACH resource.

In legacy systems, one RA-RNTI is determined when one or more preambles are transmitted as a part of a random access procedure on a cell. The UE then monitors PDCCH of the PCell for a RAR corresponding to the determined RA-RNTI. Example embodiments enhances the random access procedure by calculating multiple RA-RNTIs for multiple RAPs transmitted via the cell. The UE monitors a PDCCH for at least one RAR associated with at least one of the plurality of RA-RNTIs. Calculation of multiple RA-RNTIs and monitoring PDCCH for DCIs associated to multiple RA-RNTIs may increase processing requirements for the UE. This process enhances the random access procedure. The wireless device may stop monitoring PDCCH in response to receiving at least one RAR corresponding to at least one of the plurality of RA-RNTIs.

In an example, the wireless device may monitor a PDCCH channel in response to transmission of RAPs. Examples are shown in FIG. 22 and in FIG. 23. The wireless may monitor, within a first duration, the PDCCH channel in response to transmission of RAPs. In an example, the first duration may be configured and/or indicated to the wireless device. In an example, the first duration may be a random access response (RAR) window. In an example, the first duration may be based on a plurality of RAR windows corresponding to the plurality of RAPs. The wireless device may monitor the PDCCH for at least one random access response (RAR) corresponding to at least one of the plurality of RAPs. In an example, the monitoring may start after a first RAP of the plurality of RAPs. In an example, the monitoring may start after a second duration after the first RAP is transmitted. In an example, the second duration may be fixed/pre-configured. In an example, the second duration may be configured and/or indicated to the wireless device (e.g., using RRC and/or PDCCH). In an example, the first RAP may be an earliest transmitted RAP in the plurality of RAPs, may be a latest transmitted RAP in the plurality of RAPs, or may be a RAP in the plurality of RAPs. The monitoring may be based, at least in part, on the plurality of RA-RNTIs. The wireless device may check if a CRC of the PDCCH is scrambled by a RA-RNTI (e.g., a RA-RNTI in a plurality of RA-RNTIs).

In an example, the wireless device may receive a first RAR corresponding to one of the plurality of RAPs.

Examples are shown in FIG. 22 and FIG. 23. The first RAR may comprise an uplink grant. The first RAR may further comprise a timing advance command. In an example, the uplink grant may comprise transmission parameters for one or more transport blocks (TBs). The transmission parameters may comprise a power control command, transport block size, modulation and coding scheme (MCS), etc. The wireless device may employ the transmission parameters and may construct one or more transport blocks. In an example, the wireless device may stop monitoring the PDCCH after receiving the first RAR (e.g., as shown in FIG. 22).

In an example, the UE may determine a transmission power for a first transmission of RAP. In an example, the wireless device may determine a first power level of a first RAP in the plurality of RAPs for transmission via a first RACH resource of the plurality of RACH resources. The determining may based on one or more parameters configured for the wireless device (e.g., using RRC). In an example, the determining may comprise one or more preamble transmission counter values maintained by a MAC entity. In an example, the wireless device may employ a pathloss estimate associated with the first RACH resource.

In an example, the wireless may transmit a second plurality of RAPs in response to the wireless device not receiving a RAR during the first duration. The wireless device may increase preamble transmission power by a ramp up value. An example of this procedure is shown in FIG. 23. The wireless device may perform a second monitoring of the PDCCH during a second monitoring period. The second monitoring period may start after a second RAP in the second plurality of RAPs. The second monitoring may be based, at least, on the plurality of RA-RNTIs. The wireless device may receive a RAR during the second monitoring period. The RAR may comprise a timing advance command. The RAR may comprise an uplink grant. The uplink grant may comprise transmission parameters for one or more transport blocks (TBs). The wireless device may transmit the one or more TBs.

Example embodiments enhance random access procedure on a cell. A wireless device transmits a plurality of preambles on a plurality of random access resources on a cell. The wireless device determines a plurality of RA-RNTIs based, at least, on the plurality of random access resources. The wireless device monitors within a first duration a PDCCH for RAR corresponding to a plurality of RA-RNTIs for at least one RAR. In an example, if no RAR is received within the first duration, the wireless may transmit a plurality of preambles and may repeat the process. An example process is different from initiating multiple random access processes on one or a plurality of cells. Transmission of a plurality of RAPs, determination of a plurality of RA-RNTIs, as well as monitoring of a PDCCH for the plurality of RA-RNTIs improves efficiency of a random access process initiated on a cell.

According to various embodiments, a device such as, for example, a wireless device, a base station and/or the like, may comprise one or more processors and memory. The memory may store instructions that, when executed by the one or more processors, cause the device to perform a series of actions. Embodiments of example actions are illustrated in the accompanying figures and specification.

Figure 24:
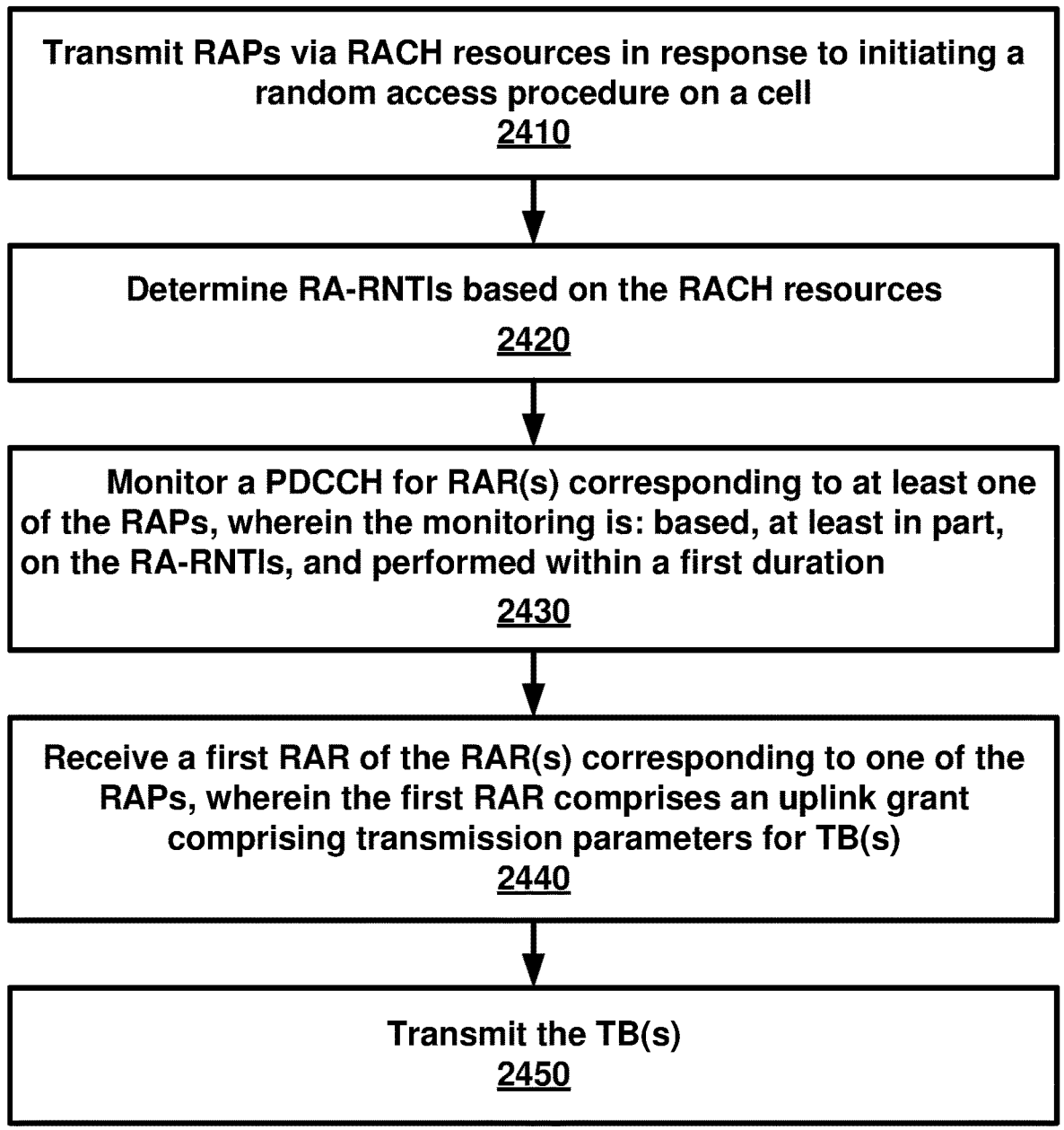
FIG. 24 is an example flow diagram as per an aspect of an embodiment of the present disclosure.

FIG. 24 is an example flow diagram as per an aspect of an embodiment of the present disclosure. At 2410, a plurality of random access preambles (RAPs) may be transmitted via a plurality of random access channel (RACH) resources in response to initiating a random access procedure on a cell. In an example, the plurality of RACH resources may be in a plurality of subframes. In an example, the plurality of RACH resources may be determined at least, based on broadcast information. In an example, the wireless device may employ at least information transmitted by one or more signals (e.g., one or more synchronization signals) to determine the plurality of RACH resources. At 2420, a plurality of random access radio network temporary identifiers (RA-RNTIs) may be determined based on the plurality of RACH resources. In an example, the base station and the wireless device may determine the plurality of RA-RNTIs. At 2430, a physical downlink control channel (PDCCH) may be monitored for at least one random access response (RAR) corresponding to at least one of the plurality of the RAPs. The monitoring may be based, at least in part, on the plurality of RA-RNTIs. In an example, a cyclic redundancy code (CRC) of the PDCCH may be scrambled with a RA-RNTI corresponding to at least one of the RAPs. The monitoring may be performed within a first duration. At 2440, a first RAR of the at least one RAR corresponding to at least one of the plurality of RAPs may be received. The first RAR may comprise an uplink grant. The uplink grant may comprise transmission parameters for one or more transport blocks (TBs). In an example, the transmission parameters may comprise one or more uplink resources and/or modulation and coding scheme (MCS) and/or a power control command, etc. At 2450, a one or more TBs may be transmitted.

According to an embodiment, the first duration may start after the transmitting of a first RAP of the plurality of RAPs. In an example, the first RAP may be an earliest transmitted RAP of the plurality of RAPs. In an example, the first RAP may be latest transmitted RAP of the plurality of RAPs. In an example, the first duration may start after a pre-configured time from the first RAP. In an example, the first duration may start after a configurable time from the first RAP. In an example, the configurable time may be indicated by a DCI. In an example, the configurable time may be indicated by a PDCCH initiating the random access procedure. In an example, the configurable time may be configured by RRC. According to an embodiment, the wireless device may further receive a PDCCH order configured to initiate the random access procedure. According to an embodiment, the PDCCH order may indicate one or more identifiers of the plurality of RAPs. According to an embodiment, the wireless device may further stop the monitoring the PDCCH for the at least one RAR in response to the wireless device receiving at least one of the at least one RAR corresponding to at least one of the plurality of RAPs. According to an embodiment, the wireless device may further construct the one or more TBs using the transmission parameters. According to an embodiment, the wireless device may further receive one or more messages comprising configuration parameters for the plurality of RACH resources. According to an embodiment, the first duration may be determined, at least, based on the configuration parameters. According to an embodiment, the determining the plurality of RA-RNTIs may be further based, at least in part on one or more time resource identifiers of the plurality of RACH resources and/or on one or more frequency resource identifiers of the plurality of RACH resources. According to an embodiment, the wireless device may determine a first power level of a first RAP of the plurality of RAPs for transmission via a first RACH resource of the plurality of RACH resources. According to an embodiment, the determining may be, at least, based on a pathloss estimate associated with the first PRACH resource.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
consecutively transmitting, by a wireless device, a plurality of preambles at different times;
monitoring, after transmitting a first preamble in the plurality of preambles and at least until a transmission of a last preamble in the plurality of preambles, a control channel for a plurality of random access responses (RARs) identified by random access radio network temporary identifiers (RA-RNTIs), wherein each of the RA-RNTIs corresponds to one of the transmitted preambles; and
transmitting a packet based on receiving a first RAR of the RARs.

2. The method of claim 1, further comprising receiving a control channel order configured to initiate a random access procedure.

3. The method of claim 2, wherein the control channel order indicates one or more identifiers of the preambles.

4. The method of claim 1, further comprising determining the RA-RNTIs based on resources employed for transmission of the preambles.

5. The method of claim 4, wherein the determining is further based on:
one or more time identifiers of the resources; or
one or more frequency identifiers of the resources.

6. The method of claim 1, further comprising stopping monitoring the control channel for the RARs based on the receiving the first RAR.

7. The method of claim 1, further comprising constructing the packet based on transmission parameters, wherein the first RAR indicates the transmission parameters.

8. The method of claim 1, further comprising receiving configuration parameters indicating resources for transmission of the preambles.

9. The method of claim 1, further comprising determining a first power level, of a first preamble of the preambles for transmission via a first resource, based on a pathloss estimate associated with the first resource.

10. The method of claim 1, further comprising receiving the first RAR of the RARs based on the monitoring.

11. A wireless device comprising:
one or more processors; and
memory storing instructions that, when executed by the one or more processors, cause the wireless device to:
consecutively transmit a plurality of preambles at different times;
monitor, after transmitting a first preamble in the plurality of preambles and at least until a transmission of a last preamble in the plurality of preambles, a control channel for a plurality of random access responses (RARs) identified by random access radio network temporary identifiers (RA-RNTIs), wherein each of the RA-RNTIs corresponds to one of the transmitted preambles; and
transmit a packet based on receiving a first RAR of the RARs.

12. The wireless device of claim 11, wherein the instructions, when executed, further cause the wireless device to receive a control channel order configured to initiate a random access procedure.

13. The wireless device of claim 12, wherein the control channel order indicates one or more identifiers of the preambles.

14. The wireless device of claim 11, wherein the instructions, when executed, further cause the wireless device to determine the RA-RNTIs based on resources employed for transmission of the preambles.

15. The wireless device of claim 14, wherein the instructions, when executed, further cause the wireless device to determine the RA-RNTIs based on:
one or more time identifiers of the resources; or
one or more frequency identifiers of the resources.

16. The wireless device of claim 11, wherein the instructions, when executed, further cause the wireless device to stop monitoring the control channel for the RARs based on the receiving the first RAR.

17. The wireless device of claim 11, wherein the instructions, when executed, further cause the wireless device to construct the packet based on transmission parameters, wherein the first RAR indicates the transmission parameters.

18. The wireless device of claim 11, wherein the instructions, when executed, further cause the wireless device to receive configuration parameters indicating resources for transmission of the preambles.

19. The wireless device of claim 11, wherein the instructions, when executed further cause the wireless device to determine a first power level, of a first preamble of the preambles for transmission via a first resource, based on a pathloss estimate associated with the first resource.

20. The wireless device of claim 11, wherein the instructions, when executed further cause the wireless device to receive the first RAR of the RARs based on the monitoring.

* * * * *